(12) United States Patent
Watanabe

(10) Patent No.: US 6,989,929 B2
(45) Date of Patent: Jan. 24, 2006

(54) FRESNEL LENS SHEET AND REAR PROJECTION SCREEN INCLUDING THE SAME

(75) Inventor: Hitomu Watanabe, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/637,050

(22) Filed: Aug. 8, 2003

(65) Prior Publication Data
US 2005/0099687 A1    May 12, 2005

(30) Foreign Application Priority Data
Aug. 9, 2002    (JP)    .............................. 2002-233803

(51) Int. Cl.
G03B 21/60    (2006.01)
G03B 21/56    (2006.01)
G02B 3/08    (2006.01)

(52) U.S. Cl. ...................... 359/457; 359/460; 359/742

(58) Field of Classification Search ................ 359/454, 359/456, 457, 460, 742
See application file for complete search history.

(56) References Cited

U.S. PATENT DOCUMENTS

| | | | | |
|---|---|---|---|---|
| 4,512,631 A | * | 4/1985 | VanBreemen | 359/457 |
| 4,963,016 A | * | 10/1990 | Heijnemans et al. | 353/74 |
| 6,031,664 A | * | 2/2000 | Goto | 359/456 |
| 6,292,295 B1 | * | 9/2001 | Yamashita et al. | 359/460 |
| 6,804,055 B2 | * | 10/2004 | Peterson et al. | 359/457 |
| 2002/0089743 A1 | * | 7/2002 | Ogawa | 359/460 |

FOREIGN PATENT DOCUMENTS

| | | | |
|---|---|---|---|
| JP | 61-254941 | | 11/1986 |
| JP | 62-113131 | | 5/1987 |
| JP | 63-032528 | | 2/1988 |
| JP | 63-037336 | | 2/1988 |
| JP | 63-037337 | | 2/1988 |
| JP | 63-110434 | * | 5/1988 |
| JP | 63-139331 | | 6/1988 |
| JP | 63-030835 | | 9/1988 |
| JP | 05-072634 | | 3/1993 |

* cited by examiner

Primary Examiner—Melissa J Koval
(74) Attorney, Agent, or Firm—Oliff & Berridge, PLC

(57) ABSTRACT

A Fresnel lens sheet includes: a sheet-shaped base; multiple first prisms with substantially triangular cross-sections formed on a light-source-side surface of the base; and multiple second prisms with substantially triangular cross-sections formed on a viewing-side surface of the base. Rear projection screens including such Fresnel lens sheets are also provided.

15 Claims, 13 Drawing Sheets

FRESNEL LENS SHEET AND REAR PROJECTION SCREEN INCLUDING THE SAME

BACKGROUND OF THE INVENTION

1. Field of the Invention

The present invention relates to a rear projection screen for use as the display screen of a projection-type television. More particularly, the present invention relates to a Fresnel lens sheet useful in allowing imaging light obliquely projected on the lens sheet from the light-source (rear) side to emerge from the lens sheet toward the viewing side in order to display an image, and it also relates to a rear projection screen including such a Fresnel lens sheet.

2. Description of Related Art

To achieve projection (enlargement projection) of imaging light emitted from a light source, a rear projection screen is placed in a projection-type television as its display screen. Usually used for such a rear projection screen is a combination of a Fresnel lens element that refracts imaging light projected on the element from a light source and allows the refracted light to emerge from the element toward the viewing side as rays almost parallel to each other, and a diffusion element such as lenticular lenses that scatter the imaging light toward those viewers who are watching the screen from wide-ranged directions.

A projection-type television provided with a CRT-type light source, in which different CRT's are used to project rays of the three primary colors, as well as one provided with a single-lens-type light source using an LCD (liquid crystal device) or DLP (digital light processing), have come to be used as the above-described projection-type television.

Of these projection-type televisions, the projection-type television provided with a CRT-type light source has usually been such that imaging light is projected, from the light-source side of the rear projection screen, on the central part of the rear projection screen almost perpendicularly to it. Also in the projection-type television provided with a single-lens-type light source, imaging light has usually been projected from the light-source side of the rear projection screen on the central part of the rear projection screen almost perpendicularly to it. Namely, as shown in FIG. 9, a projection-type television of either type is so designed that a mirror 13 reflects imaging light 10 emitted from a light source 12 to project the reflected light on the central part of a rear projection screen 3 almost perpendicularly to it.

However, as long as the manner in which imaging light is projected is as described above, even the projection-type television provided with a single-lens-type light source requires a depth nearly equal to that of conventional one provided with a CRT-type light source, and thus has the problem that its cabinet 14' cannot be made thin, as can be understood from FIG. 9.

Under these circumstances, a projection-type television, in which imaging light emitted from a light source is obliquely projected on a rear projection screen from its light source side, has been proposed in order to obtain a projection-type television much thinner than conventional ones without impairing image display performance.

In such a projection-type television, a group of prisms with triangular cross-sections (a total reflection Fresnel lens) are provided on the light-source-side surface of the rear projection screen as an optical means of collecting imaging light obliquely projected on the rear projection screen so that the imaging light projected is refracted at the first face of each prism and is then totally reflected at the second face of the prism, thereby allowing the reflected light to emerge from the viewing-side surface of the rear projection screen.

In a Fresnel lens sheet having such a total reflection Fresnel lens, since imaging light emitted from a light source is obliquely projected on the Fresnel lens sheet, the imaging light is to enter each prism at an angle of incidence that varies depending on the position of the prism located between the lower and upper edges of the Fresnel lens sheet.

Specifically, as shown in FIG. 7(a), in the part of a Fresnel lens sheet 15 on the side distant from a light source (e.g., the part of the Fresnel lens sheet 15 on the side distant from the Fresnel center, in the case where the prisms are concentrically formed around the Fresnel center that is situated not on the sheet surface), in which the angle of incidence $\theta_1$ at which imaging light 10 is incident on the Fresnel lens sheet 15 (the angle between imaging light 10 and the normal to the surface of the Fresnel lens sheet 15) is larger, the imaging light 10 is to enter each prism 43 from its first face 44, but only from the vicinity of the apex 41 of the prism 43. For this reason, all of the rays of the imaging light 10 that have entered each prism 43 from its first face 44 are totally reflected at the second face 45 of the prism 43, and all of the totally reflected rays emerge, as usable light 10A, from the viewing-side surface 48 of the Fresnel lens sheet 15.

On the contrary, as shown in FIG. 7(b), in the part of the Fresnel lens sheet 15 on the side close to the light source (e.g., the part of the Fresnel lens sheet 15 on the side close to the Fresnel center, in the case where the prisms are concentrically formed around the Fresnel center that is situated not on the sheet surface), in which the angle of incidence $\theta_1$ at which the imaging light 10 is incident on the Fresnel lens sheet 15 is smaller, the imaging light 10 is to enter each prism 43 from a wide area of its first face 44, covering from the apex 41 to the bottom 42. For this reason, of the imaging light 10, those rays that have entered each prism 43 from its first face 44, but from the vicinity of its apex 41 are refracted at the first face 44 and then totally reflected at the second face 45; these rays are to emerge from the viewing-side surface 48 as usable light 10A. On the other hand, those rays that have entered each prism 43 from its first face 44, but from the vicinity of its bottom 42 are refracted at the first face 44 and then pass through the base, without being totally reflected at the second face 45, to finally become stray light 10B.

As shown in FIG. 8, after being totally reflected at the viewing-side surface 48, the stray light 10B thus produced passes through a plurality of the first prisms 43 on the light-source side, while repeating incidence and emergence, and finally emerges from the viewing-side surface 48. The direction in which the stray light 10B thus emerges from the viewing-side surface 48 is almost the same as that in which the usable light 10A emerges from the viewing-side surface 48, so that such troubles as the production of double images (ghosts) are caused.

A variety of methods as stated below have so far been proposed as methods for eliminating such problems as the production of double images (ghosts) due to stray light as described above.

Specifically, such a method has been proposed that the grooves between Fresnel lens prisms are filled with a light-diffusing layer (see Japanese Laid-Open Patent Publication No. 113131/1987). In this method, it is necessary to form a light-diffusing layer after forming a Fresnel lens, so that the production process according to this method is complicated. In addition, it is not easy to control the amount of diffusion of light.

Another method that has been proposed is that a light-absorbing layer is partly formed on Fresnel lens prisms (see Japanese Laid-Open Patent Publications No. 32528/1988, No. 37336/1988 and No. 72634/1993). In this method, a light-absorbing layer is formed not entirely but only partly on the prisms. This method is thus at a disadvantage in that the formation of the light-absorbing layer is difficult.

A further method proposed is that a light-absorbing layer is formed on the viewing-side surface of a Fresnel lens sheet, but only on those parts of the surface through which imaging light does not pass (see Japanese Laid-Open Patent Publications No. 30835/1988, No. 37337/1988, No. 139331/1988 and No. 72634/1993). In this method, it is necessary to adjust the position of the light-absorbing layer to be formed on the viewing side, to the position of the prisms formed on the light-source side. This method is thus at a disadvantage in that the formation of the light-absorbing layer is not easy.

A still further method proposed is that the faces of Fresnel lens prisms from which imaging light enters the prisms are curved (see Japanese Laid-Open Patent Publication No. 254941/1986). However, from the viewpoint of production, it is not easy to vary the curvature of the curved face of a prism, i.e., a plane of incidence, depending on the position of the Fresnel lens prism; it is thus difficult to uniformly display an image.

A still further method proposed is that a light-diffusing layer is additionally formed entirely on the viewing-side surfaces of Fresnel lens prisms. This method has the problem that not only stray light but also imaging light is diffused to make the displayed image blurred.

SUMMARY OF THE INVENTION

The present invention was accomplished in the light of the above-described problems in the related art. An object of the present invention is to provide; a readily producible Fresnel lens sheet including a total reflection Fresnel lens, useful in allowing imaging light obliquely projected on the lens sheet from the light-source side to emerge from the lens sheet toward the viewing side in order to display an image, and capable of effectively eliminating such problems as the production of double images (ghosts) due to stray light to display a high-quality image; and a rear projection screen including such a Fresnel lens sheet.

The present invention provides, as a first means of fulfilling the above object of the present invention, a Fresnel lens sheet for use in a rear projection screen that is used to display an image by allowing imaging light obliquely projected on the screen from the light-source side to emerge from the screen toward the viewing side, comprising: a sheet-shaped base; a plurality of first prisms with a nearly triangular cross-section, formed on the light-source-side surface of the base on which the imaging light is projected, each of the first prisms having a first face from which the imaging light enters the first prism and which refracts the incident imaging light and a second face that totally reflects, toward the viewing side, at least a part of the imaging light incident on and refracted at the first face; and a plurality of second prisms with a nearly triangular cross-section, formed on the viewing-side surface of the base from which the imaging light emerges, each of the second prisms being so constructed that, of the imaging light incident on and refracted at the first face of each of the first prisms, those rays that travel to the viewing-side surface without being totally reflected at the second face of each of the first prisms to finally become stray light are controlled with respect to the reflection angle on the viewing-side surface to allow the rays becoming stray light to emerge toward an area outside of the visual field on the viewing side.

In the above-described first means of fulfilling the object of the invention, each of the second prisms has a prism face inclined at a relatively small angle to the extended surface of the base and a rising face rising almost perpendicularly to the extended surface of the base. Preferably, the prism face is positioned so that, of the rays becoming stray light, those rays that return, after being reflected at the prism face, again to the viewing-side surface via the first prism, can emerge from the viewing-side surface at an angle greatly deviated from the normal to the extended surface of the base. Preferably, the rising face is positioned so that, of the rays becoming stray light, those rays that are reflected at the rising face, can emerge from the viewing-side surface at an angle greatly deviated from the normal to the extended surface of the base.

In addition, in the above-described first means of fulfilling the object of the invention, it is preferable that a light-absorbing or light-diffusing part be provided only on the rising face of each of the second prisms on the viewing-side surface.

Moreover, in the above-described first means, it is preferable that the rays becoming stray light emerge from the viewing-side surface at an angle of 60° or more to the normal to the extended surface of the base.

Further, in the first means described above, the plurality of second prisms may be formed either only on those parts of the viewing-side surface in which the rays becoming stray light are produced, or entirely on the viewing-side surface.

Furthermore, in the first means described above, the plurality of second prisms have prism angles that may be either the same regardless of position on the viewing-side surface or varied depending on position on the viewing-side surface.

Furthermore, in the above-described first means, it is preferable that the plurality of first prisms be concentrically formed on the light-source-side surface around the center that is situated not on the extended surface of the base.

Furthermore, in the above-described first means, it is preferable that the plurality of second prisms be concentrically formed on the viewing-side surface around the center that is situated at the same height as that of the center of the concentric circles of the plurality of first prisms. The plurality of second prisms may be formed on the viewing-side surface either linearly or concentrically around the center of the extended surface of the base.

Furthermore, in the above-described first means, it is preferable that the angle of incidence at which the imaging light is incident on the center of the edge of the base situated closest to an light source be from 30° to 45° and that the angle of incidence at which the imaging light is incident on the ends of the edge of the base situated most distantly from the light source be from 70° to 80°.

Furthermore, in the above-described first means, it is preferable that the plurality of first prisms be so constructed that the imaging light passing through the base is inclined to the light-source side relative to the normal to the extended surface of the base; and that the plurality of second prisms be so constructed that the imaging light that has passed through the base is inclined to the side opposite to the light-source side relative to the normal to the extended surface of the base.

The present invention provides, as a second means of fulfilling the object of the present invention, a rear projection screen comprising: a Fresnel lens sheet according to the above-described first means; and a light-diffusing sheet arranged on the viewing side of the Fresnel lens sheet.

According to the first and second means of fulfilling the object of the present invention, in the Fresnel lens sheet for use in a rear projection screen that is used to display an image by allowing imaging light obliquely projected on the screen from the light-source side to emerge from the screen toward the viewing side, a plurality of first prisms with a nearly triangular cross-section are provided on the light-source-side surface of the base on which imaging light is projected, and a plurality of second prisms with a nearly triangular cross-section are provided on the viewing-side surface of the base from which the imaging light emerges so that, of the imaging light incident on and refracted at the first face of each of the first prisms, those rays that travel to the viewing-side surface without being totally reflected at the second face of each of the first prism to finally become stray light, are controlled with respect to the reflection angle at the viewing-side surface to allow the rays becoming stray light to emerge toward an area outside of the visual field on the viewing side. It is therefore possible to effectively eliminate such problems as the production of double images (ghosts) due to stray light, and a high-quality image can thus be displayed.

EMBODIMENTS OF THE INVENTION

By referring to the accompanying drawings, embodiments of the present invention will be described hereinafter.

First of all, a rear projection screen including a Fresnel lens sheet according to an embodiment of the present invention will be described with reference to FIG. 4.

Figure 4:
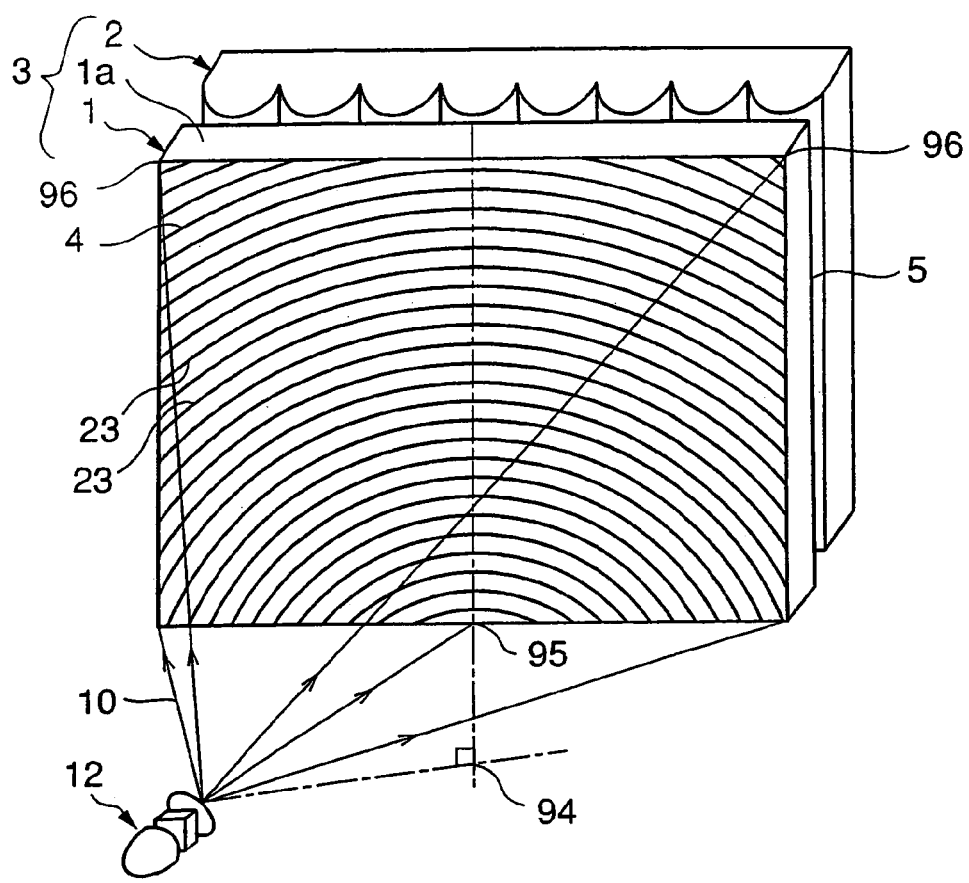
FIG. 4 is a perspective view showing an example of a rear projection screen including a Fresnel lens sheet according to an embodiment of the present invention.

As shown in FIG. 4, a rear projection screen 3 is for displaying thereon an image by allowing imaging light 10 obliquely projected on the screen 3 from the light-source side to emerge from the screen 3 toward the viewing side. As this figure shows, the rear projection screen 3 includes a Fresnel lens sheet 1 that refracts and reflects imaging light 10 projected on the Fresnel lens sheet 1 from a light source 12 to allow the refracted and reflected rays to emerge from the Fresnel lens sheet 1 toward the viewing side as rays almost parallel to each other; and a lenticular lens sheet (light-diffusing sheet) 2, arranged on the viewing side of the Fresnel lens sheet 1, for scattering the imaging light 10 and letting the scattered light 10 emerge from the lenticular lens sheet 2 toward viewers who are watching the rear projection screen 3 from wide-ranged directions.

The Fresnel lens sheet 1 contains: a sheet-shaped base 1a; and multiple first prisms 23 with nearly triangular cross-sections, formed on the light-source-side surface 4 of the base 1a on which the imaging light 10 is projected.

The multiple first prisms 23 constitute a Fresnel lens of total reflection type, and are concentrically formed on the light-source-side surface 4 around the Fresnel center (the center of the concentric circles) that is situated at a point (see reference numeral 94) not on the sheet surface (extended surface) of the base 1a.

As shown in FIG. 4, the imaging light 10 obliquely projected on the Fresnel lens sheet 1 from the light source 12 enters each prism 23 at an angle that is varied depending on the position of the prism 23 on the light-source-side surface 4 of the base 1a. The angle of incidence at which the imaging light 10 is incident on the center (see reference numeral 95) of the edge of the base 1a situated closest to the Fresnel center (the edge closest to the light source 12 for emitting the imaging light 10) is preferably from 30° to 45°, and the angle of incidence at which the imaging light 10 is incident on the ends (see reference numeral 96) of the edge of the base 1a situated most distantly from the Fresnel center is preferably from 70° to 80°. If the difference between the angle of incidence on the side close to the Fresnel center and that on the side distant from the Fresnel center is made smaller than the above, the distance between the rear projection screen 3 and the light source 12 becomes long, although the imaging light 10 is obliquely projected on the rear projection screen 3. This is unfavorable because it is impossible, in this case, to make a projection-type television including the rear projection screen 3 thin. On the other hand, if the difference between the angle of incidence on the side close to the Fresnel center and that on the side distant from the Fresnel center is made greater than the above, it becomes necessary to use a more expensive projection lens for the light source and a more costly circuit for correcting trapezoidal distortion.

Figure 5:
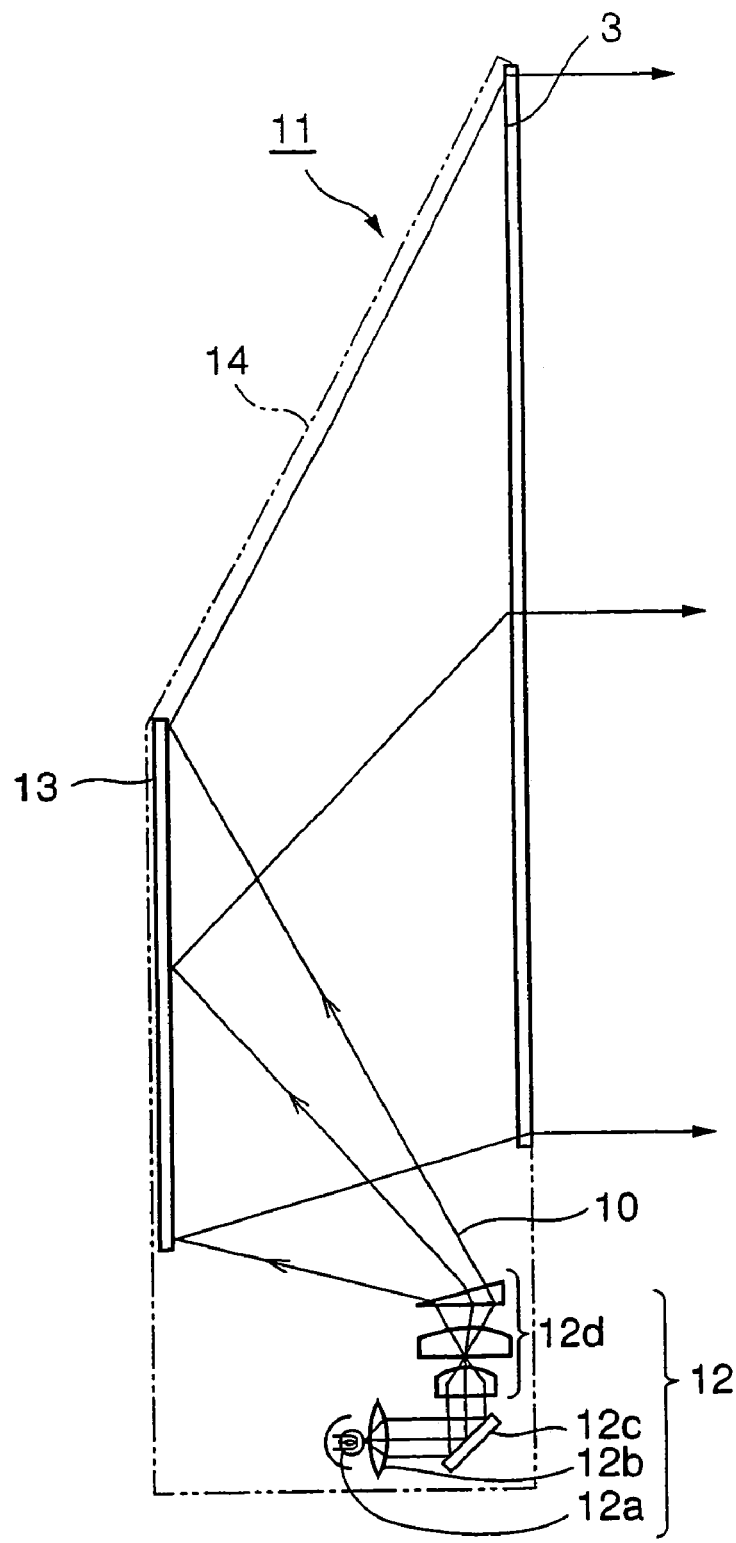
FIG. 5 is a view showing an example of a projection-type television into which a rear projection screen including a Fresnel lens sheet according to an embodiment of the present invention is incorporated.

The Fresnel lens sheet 1 as shown in FIG. 4 can be incorporated into a projection-type television 11 as shown in FIG. 5.

As shown in FIG. 5, the projection-type television 11 includes: a rear projection screen 3; a light source 12 for emitting imaging light 10 to the rear projection screen 3; and a mirror 13 for reflecting the imaging light 10 emitted from the light source 12, to the light-source side of the rear projection screen 3. The light source 12 contains: an image source 12c such as an LCD or DLP; a lamp 12a for illuminating the image source 12a; projection lenses 12b and 12d for achieving enlargement projection of the imaging light 10 emitted via the image source 12c, and so on.

The rear projection screen 3, the light source 12 and the mirror 13, being in the positional relationship as shown in FIG. 5, are contained within a cabinet 14. Namely, the rear projection screen 3 is set in a bored window made in the upper part of the viewing-side, front surface of the cabinet 14, and the light source 12 is placed in the cabinet 14 at its lower part. The mirror 13 is placed in the cabinet 14 at its upper part in nearly parallel with the rear projection screen 3 so that it can reflect imaging light 10 emitted from the light source 12, into the light-source-side surface of the rear projection screen 3. In such a projection-type television 11, the imaging light 10 emitted from the light source 12 is reflected at the mirror 13 and is then obliquely projected on the rear projection screen 3 to display a high-quality image on the viewing-side-surface of the rear projection screen 3 serving as the display screen of the projection-type television 11.

Figure 9:
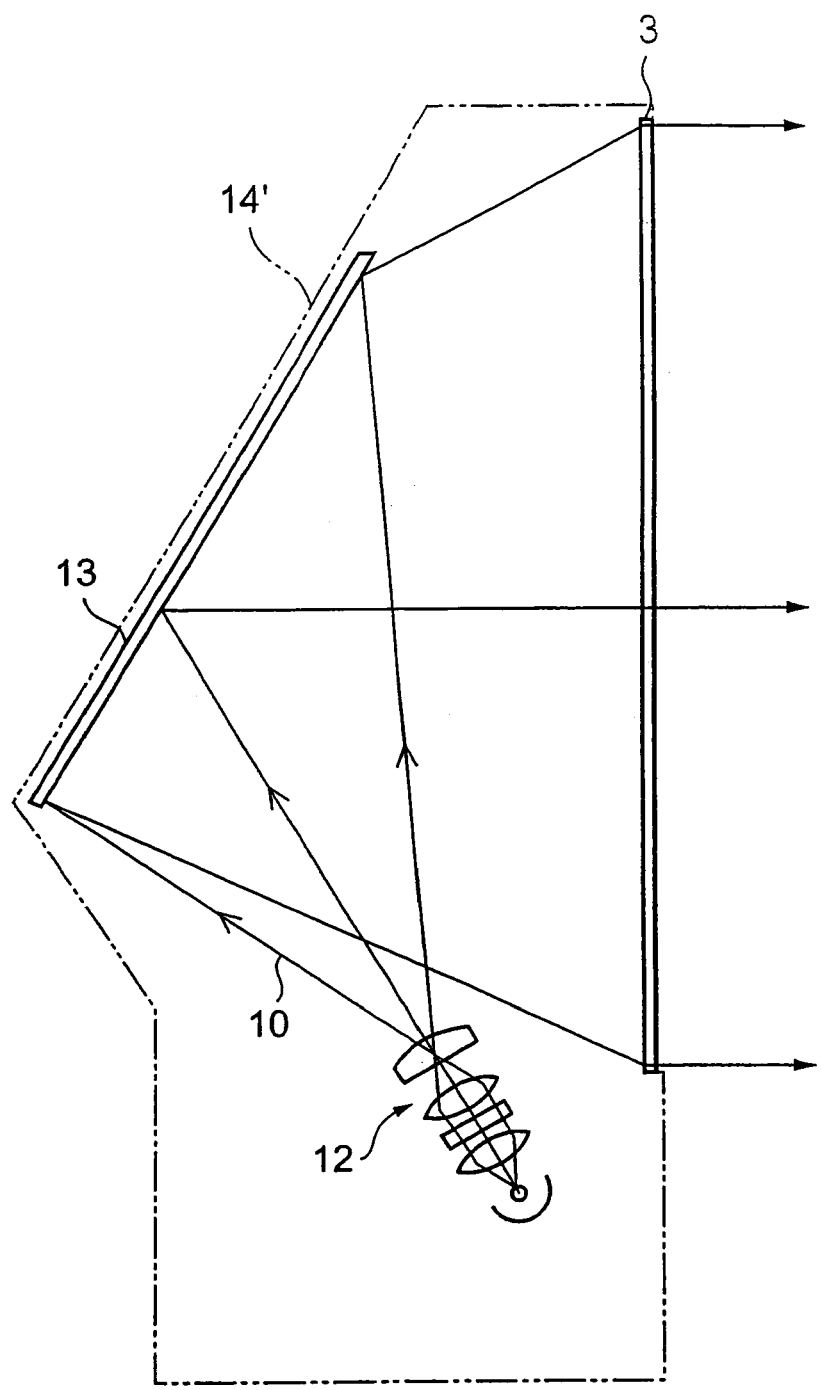
FIG. 9 is a view showing a conventional projection-type television.

In such a projection-type television 11, since the imaging light 10 emitted from the light source 12 is reflected at the mirror 13 and then projected on the rear projection screen 3, it is possible to make the cabinet 14 much thinner than the cabinet of a conventional projection-type television as shown in FIG. 9.

Next, the construction of the Fresnel lens sheet 1 for use in the rear projection screen 3 as shown in FIGS. 4 and 5 will be described in detail with reference to FIG. 1.

Figure 1:
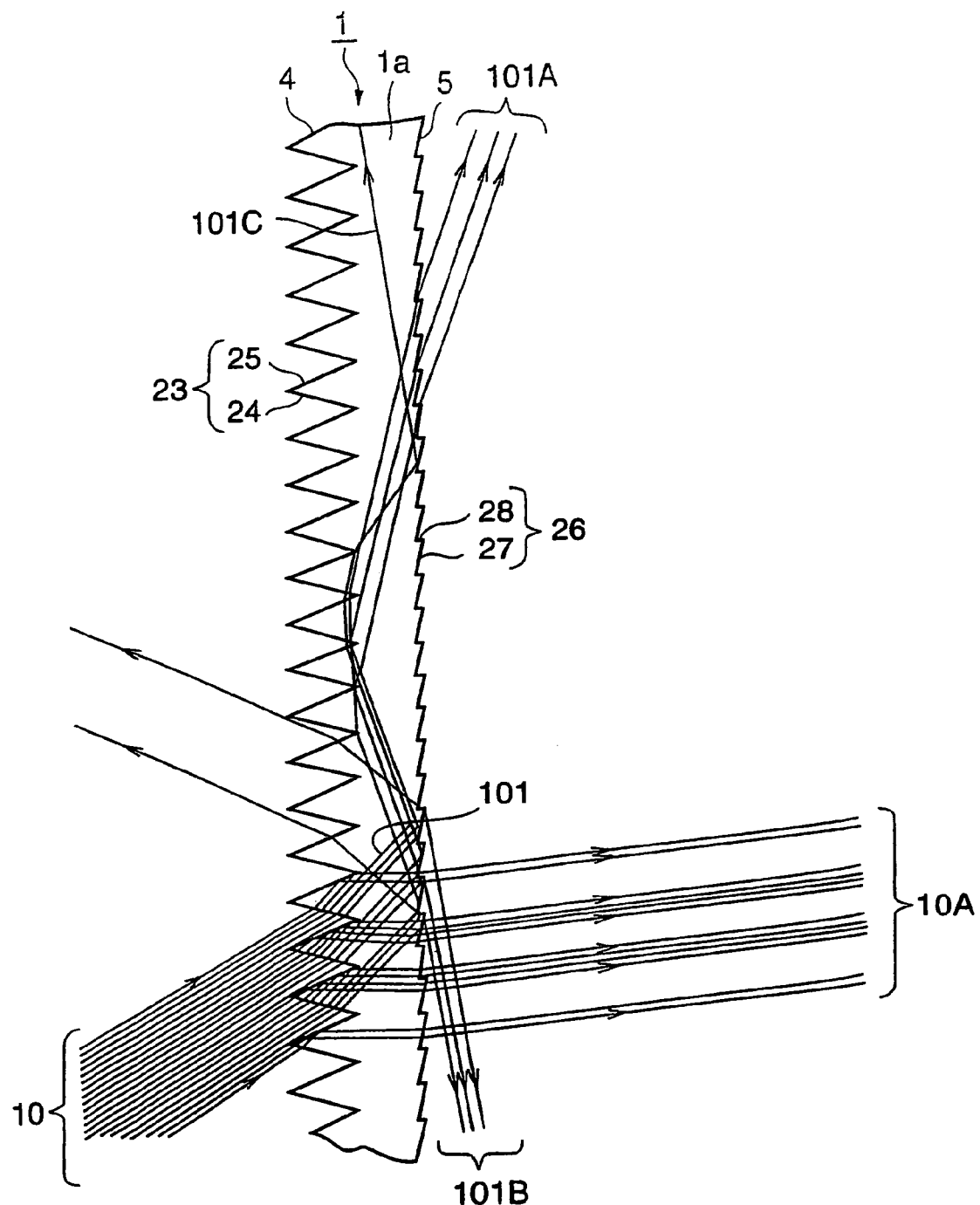
FIG. 1 is a view showing the essential part of a Fresnel lens sheet according to an embodiment of the present invention.

As shown in FIG. 1, the Fresnel lens sheet 1 includes: sheet-shaped base 1a; multiple first prisms 23 with nearly triangular cross-sections, formed on the light-source-side surface 4 of the base 1a on which imaging light 10 is projected; and multiple second prisms 26 with nearly triangular cross-sections, formed on the viewing-side surface 5 of the base 1a from which the imaging light 10 emerges.

The multiple first prisms 23 formed on the light-source-side surface 4 of the base 1a constitute a Fresnel lens of total reflection type, as mentioned previously. Each first prism 23 has a first face 24 on which the projected imaging light 10 is incident and which refracts this incident imaging light 10 and a second face 25 that totally reflects, toward the viewing side, at least a part of the imaging light 10 incedent on and refracted at the first face 24, whereby at least a part of the imaging light 10 obliquely projected on the first prism 23 can be refracted and totally reflected to the viewing-side surface 5 as usable light 10A.

Optical conditions that are taken into consideration when designing the first prisms 23 will be described with reference to FIG. 6. For easy understanding, the explanation is herein given on the assumption that the viewing-side surface 5 of the Fresnel lens sheet 1 is a flat surface. To make the geometrical relationship between the constituent parts of the first prisms 23 clearer, alphabets are used in FIG. 6 to designate them.

Figure 6:
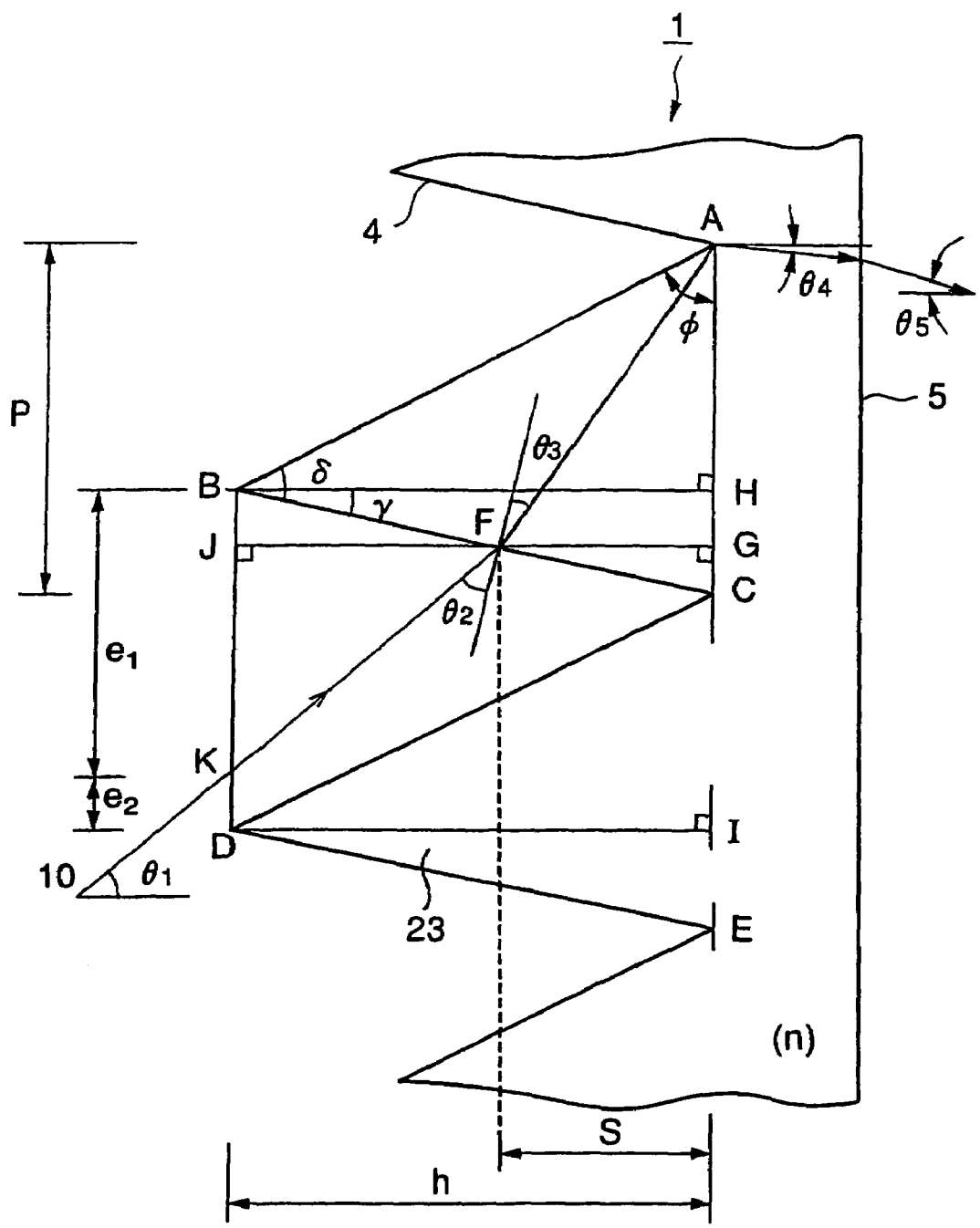
FIG. 6 is a view for explaining optical conditions that should be taken into consideration when designing a Fresnel lens sheet.
Figure 7:
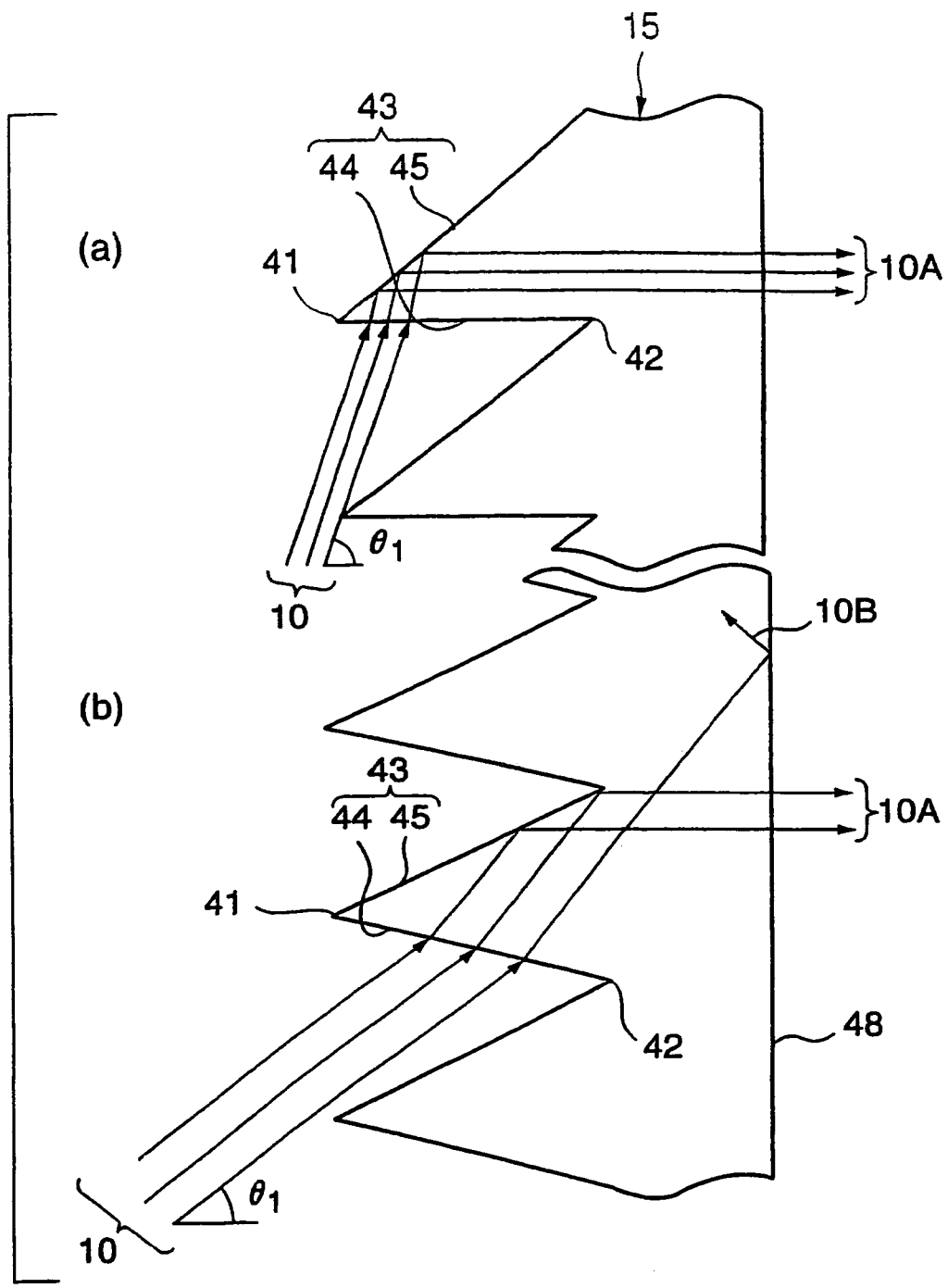
FIG. 7 is a view illustrating a conventional Fresnel lens sheet.
Figure 8:
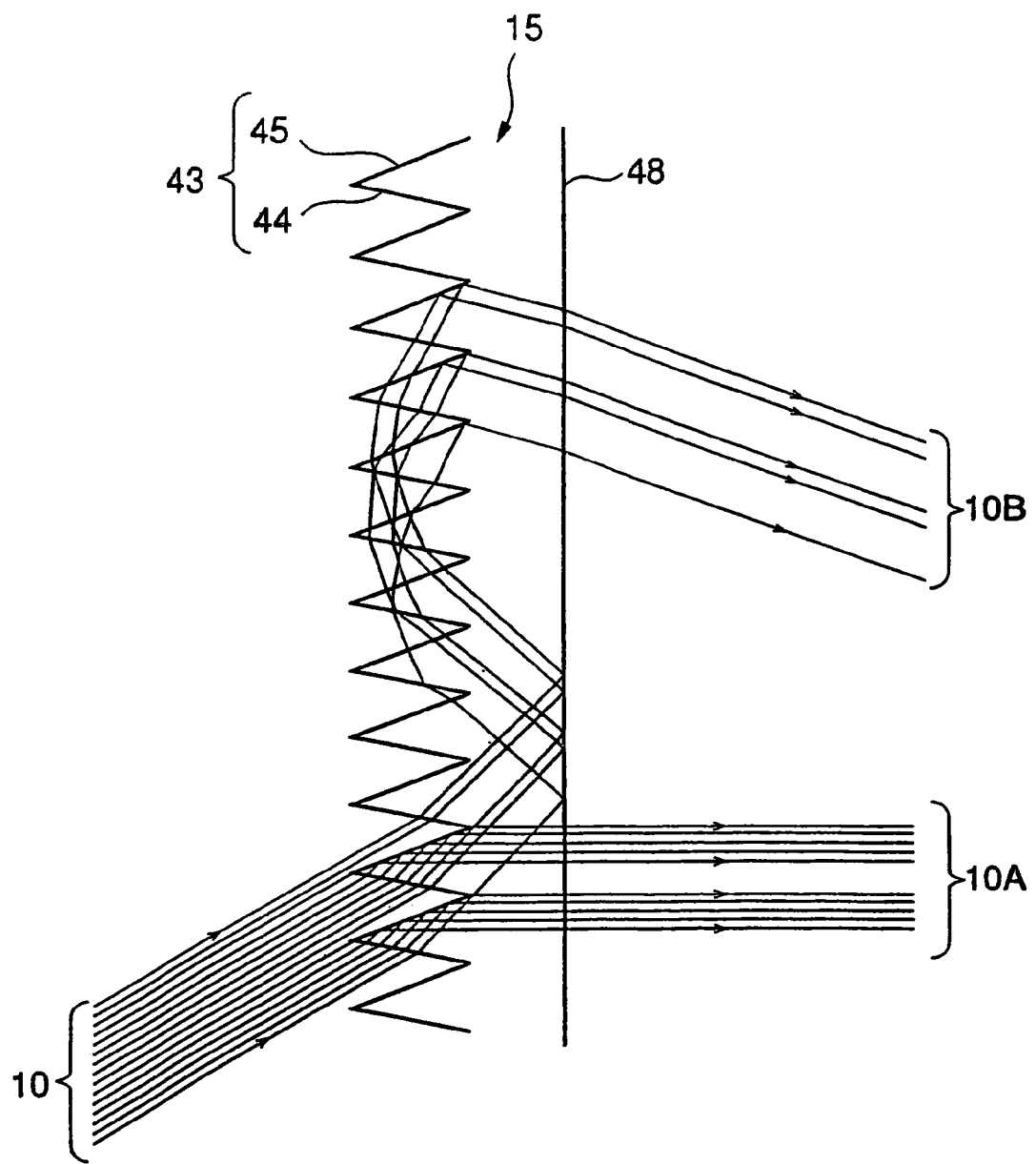
FIG. 8 is a ray tracing view for explaining how double images (ghosts) are produced when a conventional Fresnel lens sheet is used.

As shown in FIG. 6, the prism angle φ of the first prism 23 is given by the following equation (1):

$$\tan\phi = \frac{n\sin(\delta + \theta_4) + \sin(\delta + \theta_1)}{n\cos(\delta + \theta_4) - \cos(\delta + \theta_1)} \quad (1)$$

where;

$\theta_1$ is the angle of incidence of the imaging light 10;

n is the refractive index of the material for the Fresnel lens sheet 1;

$\theta_4$ is the angle between the imaging light 10 after being totally reflected at the second face AB of the first prism 23 and the normal to the sheet surface of the base 1a; and $\delta$ is the apical angle of the first prism 23.

For the relationship between the angle $\theta_4$ at which the imaging light 10 travels in the Fresnel lens sheet 1 and the angle of emergence $\theta_5$ at which the imaging light 10 emerges from the viewing-side surface 5 of the Fresnel lens sheet 1, the following equation (2) holds:

$$\sin\theta_4 = \sin\theta_5/n. \quad (2)$$

It is preferable that the angle, herein designated by γ, between the first face BC of the first prism 23 and the normal to the sheet surface of the base 1a fulfills the following relationship:

$$\gamma = \phi + \delta - \pi/2 \geq 0. \quad (3)$$

The reason for this is as follows: when the angle γ between the first face BC of the first prism 23 and the normal is negative, the first face BC of the first prism 23 is in an inversely tapered shape; it is difficult to make a mold for forming the first prisms 23 in such a shape and also not easy to form the first prisms 23 with the use of a mold. Therefore, in the region where γ is negative (γ<0), the prism angle φ of the first prism 23 is determined, upon designing, by varying the apical angle δ of the first prism 23 while keeping the first face BC of the prism 23 at a right angle to the sheet surface of the base 1a. The prism angle φ of the first prism 23 in this case is represented by the following equation (4):

$$\phi = \{\sin^{-1}(\cos\theta_1/n) + \theta_4 + \pi/2\}/2. \quad (4)$$

In the part of the above Fresnel lens sheet 1 that is situated on the side close to the light source 12 (the part on the side close to the Fresnel center), the angle of incidence $\theta_1$ at which the imaging light 10 is incident on the Fresnel lens sheet 1 being smaller, a part of the imaging light 10 incident on the first face BC of each first prism 23 are not totally reflected at the second face AB of the prism 23 and pass through the base 1a to become stray light.

To explain how stray light is produced in the first prisms 23, the imaging light 10 that is incident on the first face BC of each first prism 23 and is then refracted toward the bottom A of the first prism 23 (i.e., the imaging light that passes through the boundary between the part of the first prism 23 in which the imaging light 10 becomes stray light and that of the first prism 23 in which the imaging light 10 becomes usable light) will now be examined. It is herein assumed that the prism angles φ of the two adjacent first prisms 23 are nearly equal to each other.

If the angle of incidence at which the imaging light 10 is incident on the first face BC of each first prism 23 is designated by $\theta_2$; the angle of refraction at which the imaging light 10 is refracted at the first face BC of the first prism 23, by $\theta_3$; the prism pitch (lens pitch) of the first prisms 23, by p; the width of the part BK in which the imaging light 10 is totally reflected at the second face AB of each first prism 23 and is thus effectively used as usable light, by $e_1$; the width of the part KD in which the imaging light 10 is not totally reflected at the second face AB of each first prism 23 and thus becomes stray light, by $e_2$; the height BH of each first prism 23, by h; and the height FG of the boundary, on the first face BC of each first prism 23, between the part in which the imaging light 10 becomes stray light and the part in which the imaging light 10 becomes usable light, by s, the width $e_1$ of the part in which the imaging light 10 becomes usable light is given by the following equation (5):

$$e_1 = (h-s) \times (\tan\gamma + \tan\theta_1) \qquad (5)$$
$$= (h-s) \times (\tan(\phi + \delta - \pi/2) + \tan\theta_1),$$

where h and s are represented by the following equations (6) and (7), respectively:

$$h = p \times \tan(\phi+\delta) \times \tan\phi(\tan(\phi+\delta) - \tan\phi). \qquad (6)$$

$$s = -p \times \tan(\phi+\delta)/(1+(\tan(\phi+\delta) \times \tan(\phi+\delta+\theta_3))), \qquad (7)$$

where $\theta_3$ is given by the following equation (8):

$$\theta_3 = \sin^{-1}\{\sin(\theta_1 + \phi + \delta)/n\}. \qquad (8)$$

As is clear from FIG. 6, the relationship between the prism pitch p and the width $e_1$ of the part in which the imaging light 10 becomes usable light is given by the equation $p = e_1 + e_2$, and it is thus clear that $e_1$ is equal to or smaller than p ($e_1 \leq p$). Further, the proportion $e_1/p$ of the prism pitch p to the width $e_1$ of the part in which the imaging light 10 becomes usable light increases as the angle of incidence $\theta_1$ of the imaging light 10 increases, and at a certain point, $e_1$ becomes equal to p ($e_1 = p$). In the region in which the angle of incidence $\theta_1$ of the imaging light 10 is greater than that at the point at which $e_1$ is equal to p, all the imaging light 10 incident on the first face BC of the first prism 23 is totally reflected at the second face AB of the prism 23, so that no stray light exists in this region.

Shown in Table 1 is the relationship between $\delta$, $\theta_1$ and $\phi$, obtained by calculation using the above equations, at the boundary ($e_1 = p$) between the part in which the imaging light 10 becomes stray light and the part in which the imaging light 10 becomes usable light, when the imaging light 10 perpendicularly emerges (angle of emergence $\theta_s = 0$) from the viewing-side surface 5 of the base 1a of the Fresnel lens sheet 1. Table 1 contains the results of calculation made on three different cases where the refractive indices n of the materials for Fresnel lens sheets 1 are 1.49, 1.55 and 1.59, respectively.

TABLE 1

| | n = 1.49 | | n = 1.55 | | n = 1.59 | |
|---|---|---|---|---|---|---|
| δ[°] | $\theta_1$[°] | ø [°] | $\theta_1$[°] | ø [°] | $\theta_1$[°] | ø [°] |
| 35 | 44.03 | 60.71 | 43.85 | 60.08 | 43.75 | 59.67 |
| 36 | 44.69 | 60.74 | 44.49 | 60.15 | 44.37 | 59.77 |
| 37 | 45.35 | 60.76 | 45.13 | 60.21 | 45.00 | 59.86 |
| 38 | 46.01 | 60.77 | 45.81 | 60.25 | 45.64 | 59.93 |
| 39 | 46.68 | 60.77 | 46.45 | 60.33 | 46.29 | 59.99 |
| 40 | 47.34 | 60.77 | 47.10 | 60.35 | 46.94 | 60.04 |
| 41 | 47.37 | 60.77 | 47.75 | 60.36 | 47.59 | 60.08 |
| 42 | 48.64 | 60.75 | 48.42 | 60.36 | 48.25 | 60.12 |
| 43 | 49.30 | 60.73 | 49.07 | 60.37 | 48.91 | 60.14 |
| 44 | 49.96 | 60.70 | 49.73 | 60.37 | 49.57 | 60.16 |
| 45 | 50.62 | 60.66 | 50.40 | 60.36 | 50.24 | 60.17 |

Shown in Table 2 is the relationship between $\phi$ and $e_2/p$ (the proportion of the prism pitch p to the width $e_2$ of the part in which the imaging light 10 becomes stray light) obtained by calculation using the above-described equations, where the angle $\theta_4$ at which the imaging light 10 travels in the Fresnel lens sheet 1 is varied while the angle of incidence $\theta_1$ of the imaging light 10 is fixed. Table 2 contains the results of the calculation made by using the same conditions as those in Examples 1 to 3 that will be described later (the refractive index n is equal to 1.55, and the apical angle δ of the first prism 23 is equal to 40°). As is clear from Table 2, if the imaging light 10 incident on the first face BC of the first prism 23 is allowed to travel toward the Fresnel-center side after being totally reflected at the second face AB of the first prism 23, it becomes possible to decrease the part in which the imaging light 10 becomes stray light.

TABLE 2

| | $\theta_4 = 0°$ | | $\theta_4 = 5°$ | | $\theta_4 = 10°$ | |
|---|---|---|---|---|---|---|
| $\theta_1$[°] | ø [°] | e2/p | ø [°] | e2/p | ø [°] | e2/p |
| 30 | 66.4 | 0.44 | 69.7 | 0.39 | 72.9 | 0.35 |
| 35 | 64.7 | 0.34 | 67.9 | 0.29 | 71.1 | 0.24 |
| 40 | 62.9 | 0.22 | 66.1 | 0.16 | 69.3 | 0.11 |
| 45 | 61.1 | 0.07 | 64.3 | 0.01 | 67.4 | 0 |

Turning now to FIG. 1, multiple second prisms 26 are formed on the viewing-side surface 5 of the base 1a of the Fresnel lens sheet 1. Each second prism 26 has a prism face 27 inclined at a relatively small angle to the sheet surface (extended surface) of the base 1a and a rising face 28 rising almost perpendicularly to the sheet surface of the base 1a. By such second prisms 26, of the imaging light 10 incident on and refracted at the first face 24 of each first prism 23, those rays 101 that travel to the viewing-side surface 5 of the base 1a without being totally reflected at the second face 25 of each first prism 23 to finally become stray light are controlled with respect to the reflection angle on the viewing-side surface 5 to allow the rays 101 (101A, 101B) becoming stray light to emerge toward an area outside of the visual field on the viewing side.

Figure 3A:
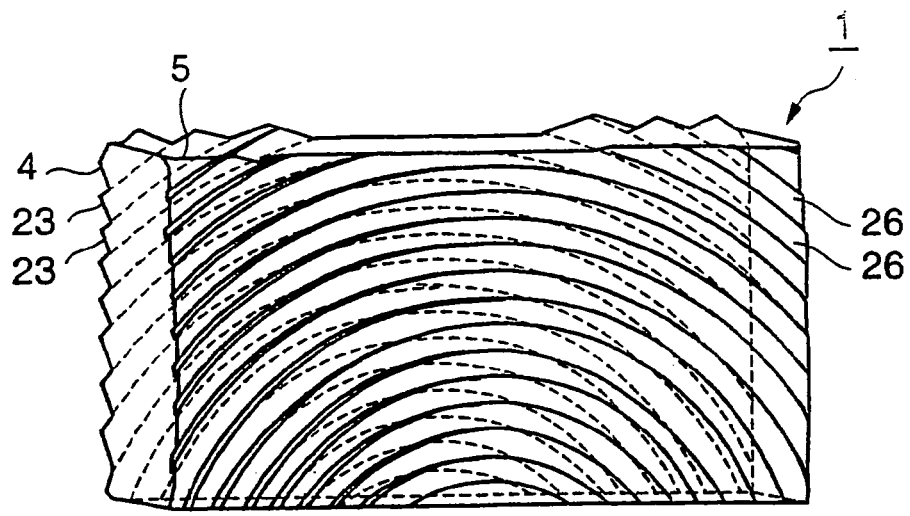
FIGS. 3A, 3B and 3C are perspective views, each showing the whole construction of a Fresnel lens sheet according to an embodiment of the present invention.

As shown in FIG. 3A, the multiple second prisms 26 are concentrically formed on the viewing-side surface 5 of the base 1a of the Fresnel lens sheet 1 around the center situated at the same height as that of the Fresnel center of the multiple first prisms 23 formed on the light-source-side surface 4 of the base 1a.

In a projection-type television into which the rear projection screen 3 including the Fresnel lens sheet 1 as shown in FIG. 1 is incorporated, the visual field, within which the displayed image can be clearly viewed from the viewing side of the rear projection screen 3, is limited in order to allow the imaging light 10 emitted from the light source 12 to effectively emerge from the screen 3 toward the viewing side. Specifically, the visual field herein limited is approximately ±40 to 60° in the horizontal direction and approximately ±5 to 20° in the vertical direction. Therefore, if the rays 101 becoming stray light are allowed to emerge toward the viewing-side surface at an angle of 60° or more, preferably 70° or more, to the normal to the sheet surface of the base 1a, these rays are to emerge toward completely excluded from the visual field both in the horizontal and vertical directions even when the multiple second prisms 26 are in the shape of concentric circles as shown in FIG. 3A. It is thus possible to effectively prevent viewers from viewing double images (ghosts) and to greatly improve the image display performance of a projection-type television.

Figure 2:
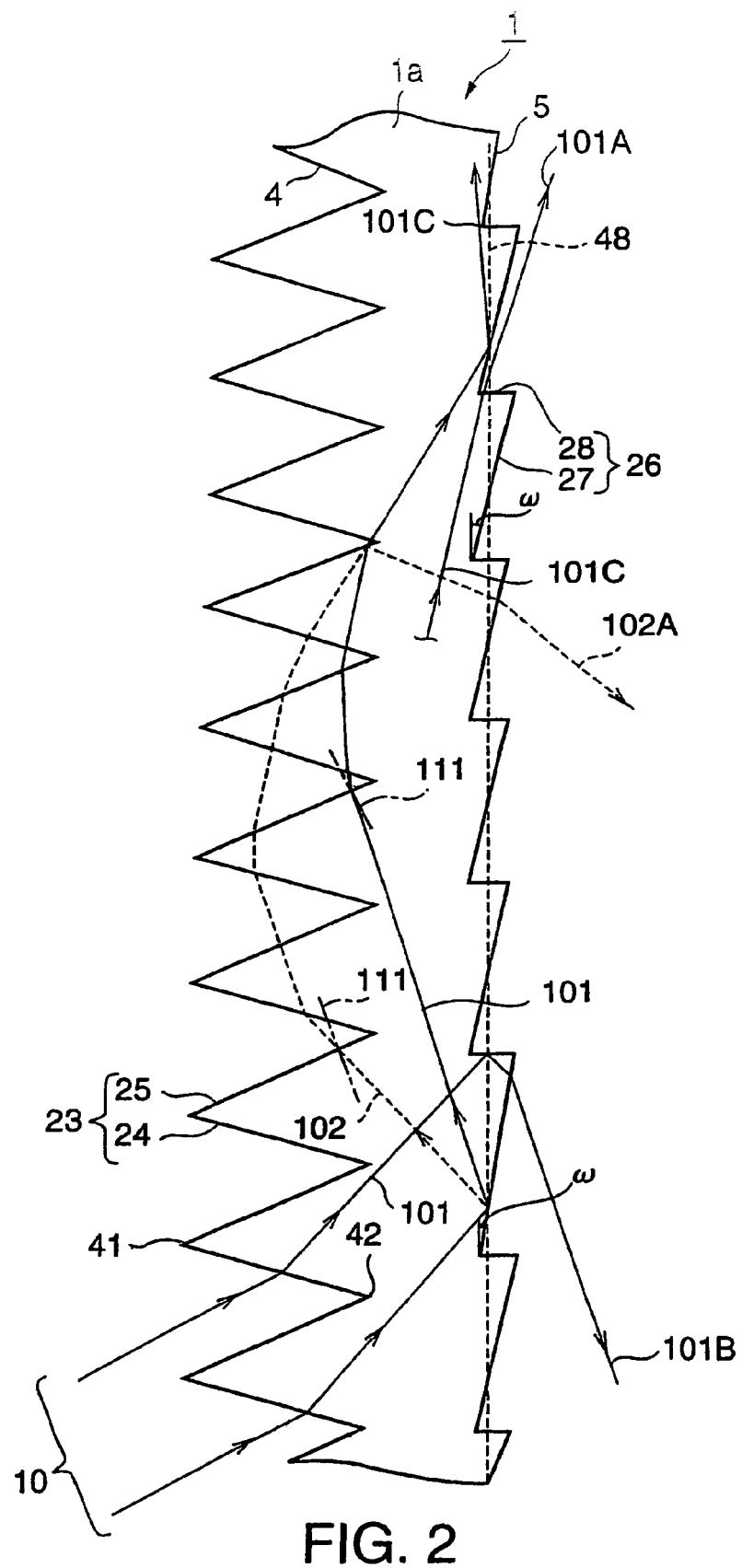
FIG. 2 is a ray tracing view for explaining the action of a Fresnel lens sheet according to an embodiment of the present invention.

Next, the action of the Fresnel lens sheet 1 will be described with reference to FIGS. 1 and 2. FIG. 2 is a view for explaining the light path of the stray light 101 in the Fresnel lens sheet 1 shown in FIG. 1. This figure includes both the light path (see the solid line in FIG. 2) of the stray light 101 in the case where the second prisms 26 are formed on the viewing-side surface 5 and the light path (see the dotted line in FIG. 2) of the stray light 101 (designated also by reference numeral 102 in the figure) in the case where the second prisms 26 are not formed on the viewing-side surface 5 (equivalent to the case where the viewing-side surface 5 is a flat surface 48).

As shown in FIG. 1, in the Fresnel lens sheet 1, the imaging light 10 incident on the first face 24 of each first prism 23 is refracted at this first face 24, and a part of the refracted rays are totally reflected at the second face 25 of the first prism 23; the totally reflected rays then travel toward the viewing side almost perpendicularly to the Fresnel lens sheet 1, and emerges as usable light 10A from the prism face 27 of each second prism 26 toward the viewing side. On the other hand, the other rays of the imaging light 10 refracted at the first face 24 of the first prism 23 pass through, without being totally reflected at the second face 25 of each first prism 23, to become stray light 101.

The stray light 101 produced from the imaging light 10 incident on the first face 24 of each first prism 23 is totally reflected at the prism face 27 of the second prism 26 formed on the viewing-side surface 5 of the base 1*a* of the Fresnel lens sheet 1 and travels to each first prism 23 formed on the light-source-side surface 4 of the base 1*a*, as shown in FIG. 2. As compared with the direction in which the stray light 102 travels in the case where the second prisms 26 are not formed, the direction in which the stray light 101 travels is greatly inclined, relative to the normal to the sheet surface of the base 1*a*, at an angle two times the prism angle ω of the prism face 27. Therefore, the stray light 101 is to travel, in nearly parallel with the sheet surface of the base 1*a*, to the light-source-side surface 4.

In the case where the second prisms 26 are not formed on the viewing-side surface 5 of the base 1*a* of the Fresnel lens sheet 1, the stray light 101 produced from the imaging light 10 incident on the first face 24 of each first prism 23 is totally reflected as stray light 102 at the flat surface 48, the viewing-side surface 5 of the base 1*a*. Thereafter, this stray light 102 emerges, toward the outside of the Fresnel lens sheet 1, from the second face 25 of the first prism 23 situated on the light path of the stray light 102 and then enters the next first prism 23 from its first face 24. At this time, the stray light 102 is incident on the second face 25 of this first prism 23 from the viewing side with respect to the normal 111 to the second face 25 of the first prism 23. Therefore, the light emerging from the second face 25 is curved to the apex side of the next first prism 23, and re-enters this first prism 23 from the mid-part of its first face 24.

The cross-sections of the first prisms 23 are triangular, so that the stray light 102 that has re-entered the next first prism 23 from its first face 24 is always curved to the viewing side, and, after passing through some of the multiple first prisms 23, returns again to the viewing-side surface 5. Thus, as shown in FIG. 2, after emerging from the bottom of the first one of the first prisms 23, the stray light 102 successively passes the mid-part of the next first prism 23 adjacent to the previous one, the apex of the next first prism 23 adjacent to the previous one, the mid-part of the first prism 23 adjacent to the previous one, and then the bottom of the next first prism 23. Namely, the curvature radius of the circle that is an approximation of the light path of the stray light 102 totally reflected at the flat surface 48, the viewing-side surface 5, is relatively small. Therefore, when the stray light 102 reaches the vicinity of the bottom of the last first prism 23, this stray light 102 is to enter the last first prism 23 from its second face 25 at an angle equal to or greater than the critical angle (approximately 42°), and is totally reflected at this second face 25. The stray light 102 thus totally reflected at the second face 25 of the last first prism 23 emerges from the flat surface 48, the viewing-side surface 5, toward the viewing side at an angle nearly equal to the angle at which usable light 10A (see FIG. 1) emerges from the viewing-side surface 5.

On the contrary, in the case where the second prisms 26 are formed on the viewing-side surface 5 of the base 1*a* of the Fresnel lens sheet 1, the stray light 101 produced from the imaging light 10 incident on the first face 24 of each first prism 23 travels to the light-source-side surface 4 in nearly parallel with the sheet surface of the base 1*a* as compared with the stray light 102. As a result, this stray light 101 is incident on the second face 25 of the first prism 23 at an angle nearly equal to the angle of the normal 111 to the second face 25 (or from the light source side with respect to the normal 111). Therefore, the light emerging from the second face 25 of the first prism 23 is to re-enter the next first prism 23 from the vicinity of its bottom.

The cross-sections of the first prisms 23 are triangular, so that the stray light 101 that has re-entered the next first prism 23 from its first face 24 is always curved to the viewing side, and, after passing through some of the multiple first prisms 23, returns again to the viewing-side surface 5. Thus, as shown in FIG. 2, the stray light 101 that has emerged from the bottom of the first one of the first prisms 23 passes the bottom of the next first prism 23, but never passes the mid-part or apex of this first prism 23. Namely, the curvature radius of the circle that is an approximation of the light path of the stray light 101 totally reflected at the prism face 27 of the second prism 26 formed on the viewing-side surface 5 is relatively great. Therefore, when the stray light 101 reaches the vicinity of the bottom of the last first prism 23, it is not totally reflected at the second face 25 of the first prism 23, but is totally reflected at the prism face 27 of the second prism 26 formed on the viewing-side, surface 5 to become stray light 101C that travels in almost parallel with the sheet surface of the base 1*a*, or to become stray light 101A that emerges from the rising face 28 of the second prism 26 toward the viewing side. The stray light 101A emerging from the rising face 28 of the second prism 26 toward the viewing side corresponds to the stray light 101 that has traveled in almost parallel with the sheet surface of the base 1*a* and emerges from the rising face 28 rising nearly perpendicularly to the sheet surface of the base 1*a*. Therefore, the stray light 101A is to emerge from the viewing-side surface at a large angle of 60° or more to the normal to the sheet surface of the base 1*a* and thus completely gets out of the visual field.

The case where the stray light 101 produced from the imaging light 10 incident on the first face 24 of each first prism 23 is totally reflected at the prism face 27 of the second prism 26 formed on the viewing-side surface 5 of the base 1*a* of the Fresnel lens sheet 1 has been taken, as an example, to give the above explanation. It is, however, also possible that the stray light 101 enters the second prism 26 not from its prism face 27 but directly from its rising face 28.

In this case, the stray light 101 is totally reflected at the rising face 28 of the second prism 26 and then emerges from the prism face 27 as stray light 101B. The stray light 101B that has emerged, after being totally reflected at the rising face 28 of the second prism 26, from the prism face 27 toward the viewing side, travels at an angle nearly equal to the angle at which the stray light 101 is totally reflected at the flat surface 48, the viewing-side surface 5. Therefore, even after being totally reflected at the rising face 28, the stray light 101B travels at an angle, to the sheet surface of the base 1a, equal to or greater than the critical angle (approximately 42°). When this stray light 101B is refracted at the prism face 27, it is to emerge at a larger angle (a large angle of 60° or more) to the normal to the sheet surface of the base 1a. The stray light 101 thus completely gets out of the visual field.

Figure 10:
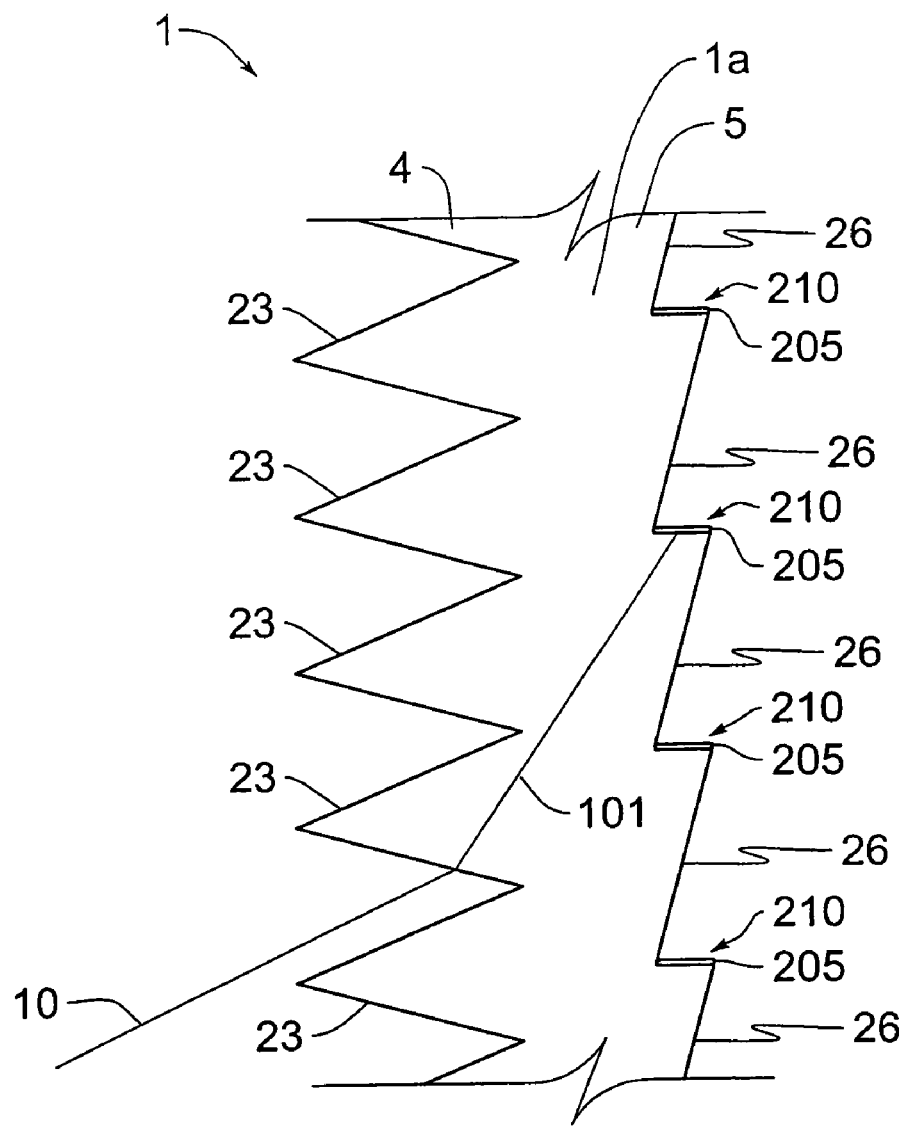
FIG. 10 is a partial schematic cross-sectional view of an exemplary Fresnel lens sheet according to the present invention.
Figure 11:
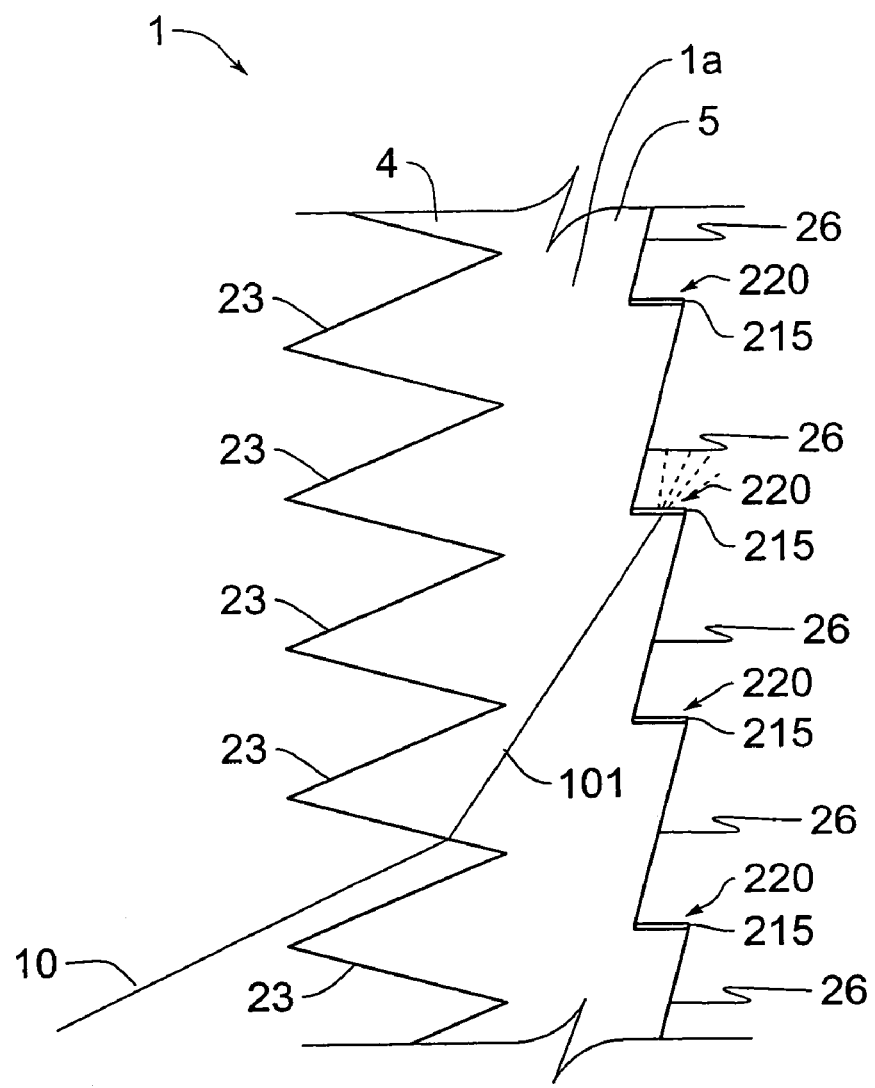
FIG. 11 is a partial schematic cross-sectional view of an exemplary Fresnel lens sheet according to the present invention.

It is herein preferable that a light-absorbing or light-diffusing part be provided on the rising face 28 of each second prism 26 formed on the viewing-side surface 5 of the base 1a of the Fresnel lens sheet 1. The reason for this is as follows: as shown in FIG. 2, the stray light rays 101A and 101B finally emerge from the viewing-side surface 5 after passing though the rising face 28 of the second prism 26 or being totally reflected at the rising face 28; therefore, if a light-absorbing layer 205 is laminated to the rising face 28 to create thereon a light-absorbing part 210 (see FIG. 10), or if a light-diffusing layer 215 is laminated to the rising face 28 or the rising face 28 is matted to provide a light-diffusing part 220 on the rising face 28 (see FIG. 11), it becomes possible to more effectively reduce the production of double images due to stray light.

Figure 12:
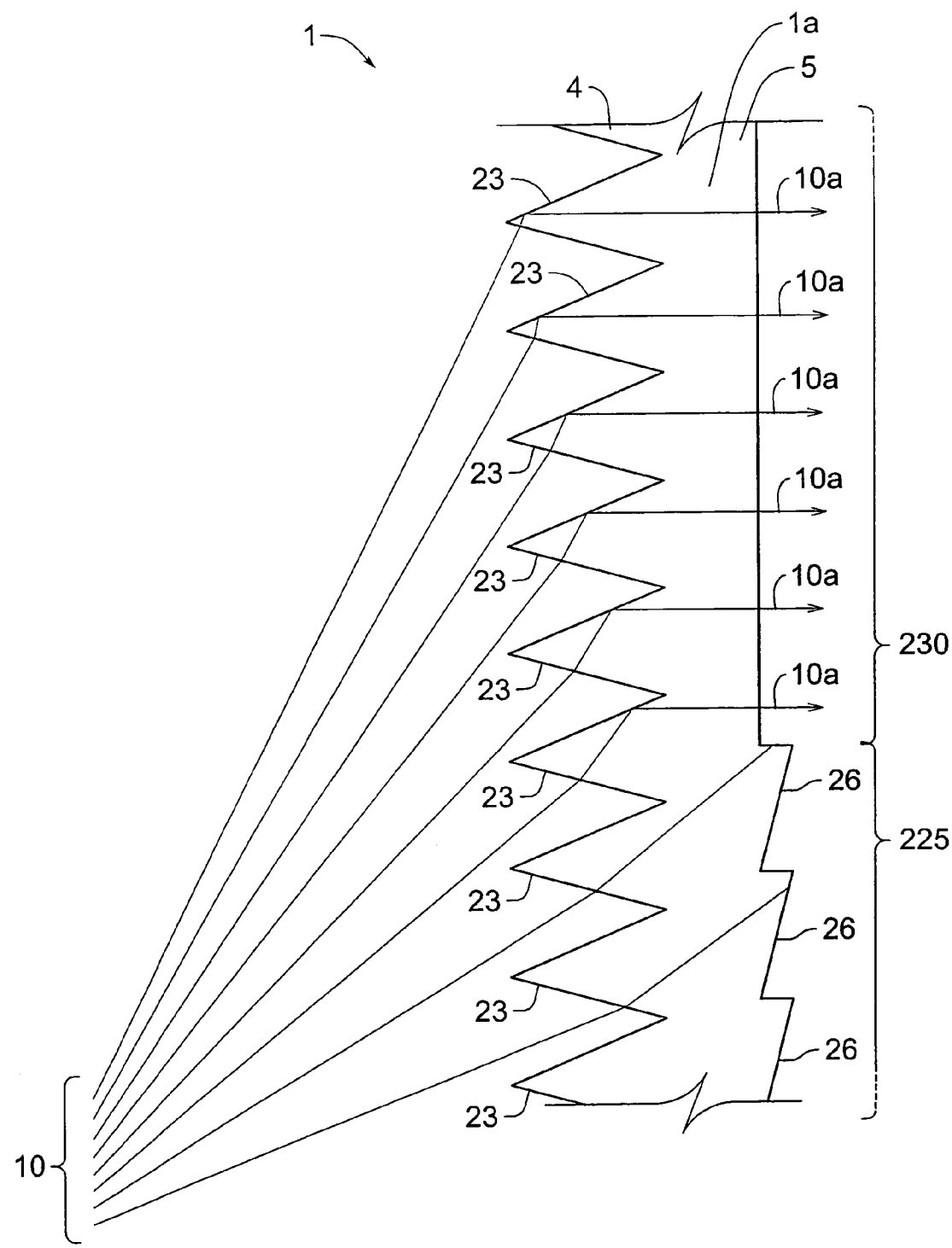
FIG. 12 is a partial schematic cross-sectional view of an exemplary Fresnel lens sheet according to the present invention.

Further, on the viewing-side surface 5 of the base 1a of the Fresnel lens sheet 1, the multiple second prisms 26 may be formed so that the multiple second prisms 26 are present in a first region 225 of the viewing-side surface 5 in which the light 101 becoming stray light is produced, but not in a second region 230 in which the light 101 becoming stray is not produced (see FIG. 12); or the multiple second prisms 26 may be formed so that the multiple second prisms 26 are present over an entirety of the viewing-side surface 5 (see FIG. 2). Even by the former embodiment, it is possible to avoid such troubles as the production of double images (ghosts) due to stray light. However, when the second prisms 26 are formed only partly on the viewing-side surface 5 (e.g., in the first region 225), the boundaries between the second prisms 26 and the other parts (e.g., a flat surface in the second region 230) tend to be observed. In the latter embodiment, such discontinuous boundaries are not created, so that it is possible to further improve image display performance.

Figure 13:
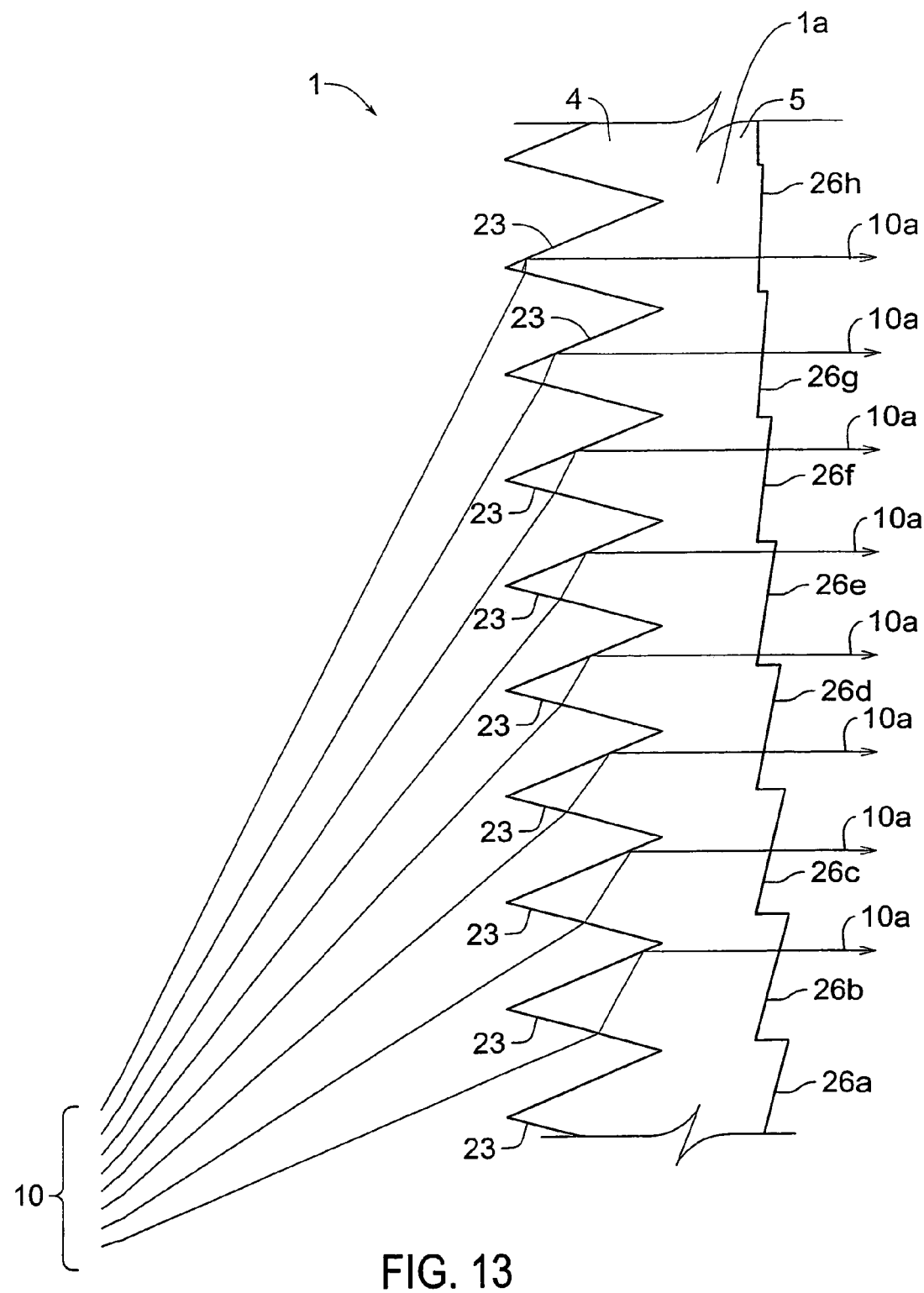
FIG. 13 is a partial schematic cross-sectional view of an exemplary Fresnel lens sheet according to the present invention.

Furthermore, the multiple second prisms 26 that are formed on the viewing-side surface 5 of the base 1a of the Fresnel lens sheet 1 have prism angles ω that are the same regardless of position on the viewing-side surface 5 (see FIG. 2). Alternatively, as shown in FIG. 13, multiple second prisms 226a, 226b, 226c, 226d, 226e, 226f, 226g, 226h may be formed on the viewing-side surface 5 of the base 1a of the Fresnel lens sheet 1 to have prism angles ω that vary depending on their respective positions on the viewing-side surface 5. In the latter embodiment, the prism angle ω may be continuously varied for every pitch, as in the first prisms 23 serving as a total reflection Fresnel lens.

The prism angles ω of the multiple second prisms 26 in the area in which the angle of incidence $\theta_1$ is from 30° to 45° and in which the light 101 becoming stray light is produced are preferably from 3° to 20°, more preferably from 5° to 15°. The case where the prism angles ω of the second prisms 26 are smaller than the above-described range is barely different from the case where the viewing-side surface 5 is a flat surface. In this case, therefore, it is impossible to obtain the effects of the formation of the second prisms 26. On the other hand, when the prism angles ω of the second prisms 26 are greater than the above-described range, it is impossible to predict the light path of the stray light 101 incident on the first face 24 of each first prism 23; such great prism angles are thus unfavorable. Specifically, as shown in FIG. 2, the stray light 101 reflected at the prism face 27 of each second prism 26 on the viewing side emerges directly from the rising face 28 of the second prism 26, and re-enters the next second prism 26 from its prism face 27 at an angle nearly equal to the angle of the stray light 102 in the case where the viewing-side surface 5 is a flat surface 48. Alternatively, the stray light 101B that emerges, after being totally reflected at the rising face 28 of the second prism 26 on the viewing side, from the prism face 27 of this second prism 26, re-enters the next second prism 26 from its rising face 28 and is totally reflected at the prism face 27 of this second prism 26.

Furthermore, the multiple first prisms 23 are preferably so constructed that the imaging light 10A passing through the base 1a of the Fresnel lens sheet 1 is inclined to the side of the light source 12 for emitting the imaging light 10A, relative to the normal to the sheet surface of the base 1a, and the multiple second prisms 26 are preferably so constructed that the imaging light 10A that has passed through the base 1a of the Fresnel lens sheet 1 is inclined to the side opposite to the side of the light source 12 for emitting the imaging light 10A, relative to the normal to the sheet surface of the base 1a. The reason for this is as follows: if the imaging light 10A that passes through the base 1a is inclined to the side of the light source 12 for emitting the emaging light 10A, relative to the normal to the sheet surface of the base 1a to increase the angle $\theta_4$ of the light path of the imaging light 10 in the base 1a, the occurrence of stray light is reduced. Even in this case, the imaging light 10A that has passed through the base 1a is inclined to the side opposite to the side of the light source 12 for emitting the imaging light 10A, relative to the normal to the sheet surface of the base 1a, by each second prism 26 formed on the viewing-side surface 5, so that the imaging light 10A can finally emerge from the viewing-side surface 5 as rays almost parallel to each other.

Thus, according to this embodiment of the present invention, in the Fresnel lens sheet 1 for use in a rear projection screen 3 useful in displaying thereon an image by allowing imaging light obliquely projected on the screen 3 from the light-source side to emerge from the screen 3 toward the viewing side, multiple first prisms 23 with nearly triangular cross-sections are formed on the light-source-side surface 4 of the base 1a on which the imaging light is projected, and multiple second prisms 26 with nearly triangular cross-sections are formed on the viewing-side surface 5 of the base 1a from which the imaging light 10 emerges, whereby, of the imaging light incident refracted at the first face 24 of each first prism 23, those rays 101 that travel to the viewing-side surface 5 without being totally reflected at the second face 25 of each first prism 23 to finally become stray light are controlled with respect to the reflection angle on the viewing-side surface 5 to allow the rays 101 (101A, 101B) becoming stray light to emerge toward an area outside of the visual field on the viewing side (at an angle, for example, of 60° or more to the normal to the sheet surface of the base 1a). It is therefore possible to effectively eliminate such problems as the production of double images (ghosts) due to stray light, and a high-quality image can thus be displayed.

Moreover, according to this embodiment, the first prisms 23 are concentrically formed on the light-source-side surface 4 of the base 1a of the Fresnel lens sheet 1, around the Fresnel center 94 situated not on the sheet surface of the base 1a. Therefore, even in the case where the light source 12 is placed below the rear projection screen 3, as shown in FIG. 4, in order to obtain a thinner projection-type television, it is possible to arrange the light source 12 on the optic axis (see the dashed line in FIG. 4) on which the Fresnel center of the first prisms 23 constituting a Fresnel lens of total reflection type is situated. The brightness of the screen can thus be made uniform.

Further, according to this embodiment, the second prisms 26 are concentrically formed on the viewing-side surface 5 of the base 1a of the Fresnel lens sheet 1, around the center situated at the same height as that of the Fresnel center of the multiple first prisms 23, so that all of the light paths of imaging light and stray light are rotationally symmetrical in terms of the Fresnel center. This makes it easy to analyze the stray light and thus to design the lenses on the Fresnel lens sheet 1.

Furthermore, according to this embodiment, the angle of incidence at which the imaging light 10 is incident on the center (see reference numeral 95) of the edge of the base 1a situated closest to the Fresnel center is made from 30° to 45°, and the angle of incidence at which the imaging light 10 is incident on the ends (see reference numeral 96) of the edge of the base 1a situated most distantly from the Fresnel center is made from 70° to 80°, so that it is possible to obtain a projection-type television thinner than a conventional, CRT-mode, projection-type television.

In the above-described embodiment, the multiple second prisms 26 are concentrically formed on the viewing-side surface 5 around the center situated at the same height as that of the Fresnel center of the multiple first prisms 23, as shown in FIG. 3A. The present invention is not limited to this, and multiple second prisms 26' may be formed linearly (in such a state that the ridgelines of the prisms extend in the horizontal direction) on the viewing-side surface 5 of a base 1a, like in a Fresnel lens sheet 1' shown in FIG. 3B, or multiple second prisms 26" may be concentrically formed on the viewing-side surface 5 of a base 1a around the center of the sheet surface of the base 1a (a geometrical center such as the center of gravity), like in a Fresnel lens sheet 1" shown in FIG. 3C.

Figure 3B:
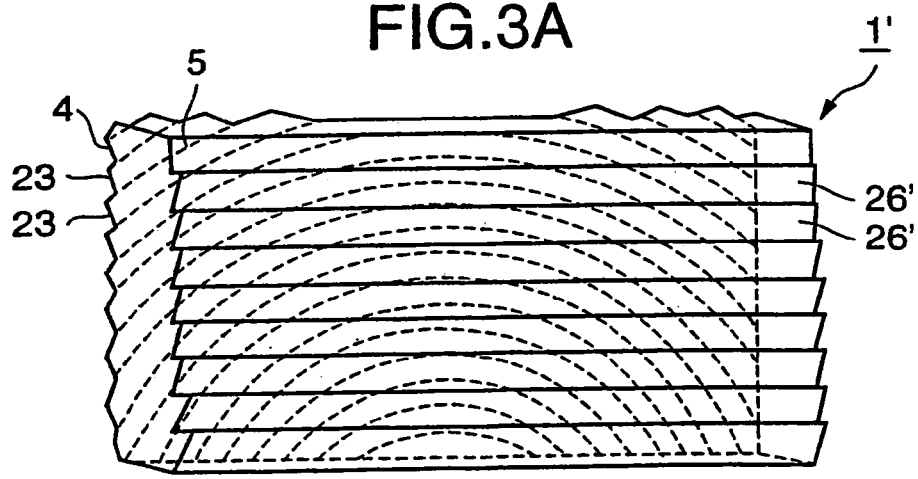
Figure 3C:
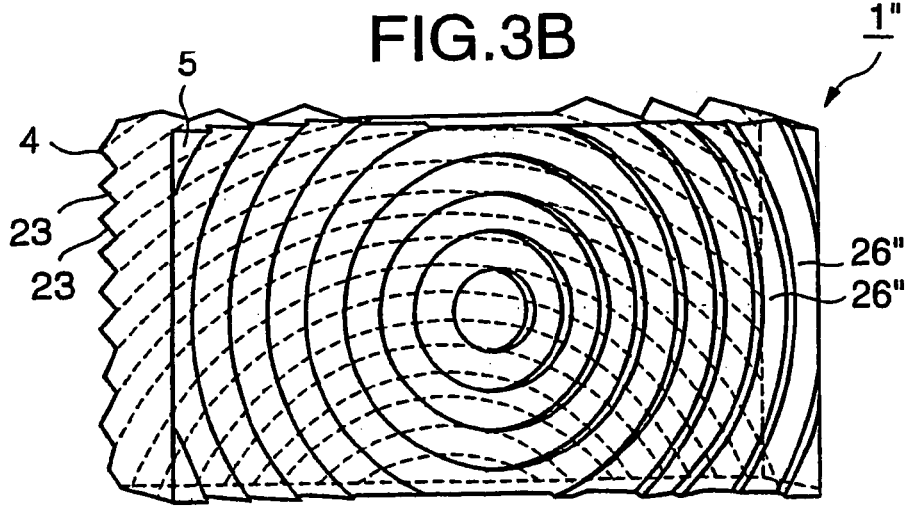

In the Fresnel lens sheet 1' shown in FIG. 3B, the multiple second prisms 26' are linearly formed on the viewing-side surface 5, so that when positioning two molds for shaping the front and back surfaces of the Fresnel lens sheet 1', positional accuracy as high as that required to make two Fresnel centers agree with each other is not required. The production of the Fresnel lens sheet 1' is therefore easier. In addition, what are formed on the light-source-side surface 4 and the viewing-side surface 5 of the Fresnel lens sheet 1' are concentric prisms and linear prisms, respectively, and a combination of prisms of these two types leads to the occurrence of Moiré fringes. However, such Moiré fringes have fully been studied so far in connection with conventional rear projection screens, so that it is easy to avoid the occurrence of Moiré fringes. On the other hand, in the Fresnel lens sheet 1" shown in FIG. 3C, the multiple second prisms 26" are concentrically formed on the viewing-side surface 5 around the center (geometric center) of the sheet surface of the base 1a. Therefore, those rays that are turned into almost-parallel or diffused rays by the first prisms 23 on the light-source side (weakly collected on the Fresnel center side and weakly diffused on the side distant from the Fresnel center) can be collected by the second prisms 26" constituting a concentric Fresnel lens, formed on the viewing side. It is thus possible to obtain a display screen with improved uniformity in brightness.

Furthermore, in the above-described embodiment, the rear projection screen 3 is, as shown in FIG. 4, composed of the Fresnel lens sheet 1 and a lenticular lens sheet 2 that have been made separately. The present invention is not limited to this, and the rear projection screen 3 may also be integrally produced in the following manner: a group of prisms that serve as a Fresnel lens of total reflection type are formed on the light-source-side surface of one sheet, and a light-diffusing element such as lenticular lenses, on the viewing-side-surface of this sheet.

Furthermore, in the aforementioned embodiment, a lenticular lens sheet 2 is arranged on the viewing side of the Fresnel lens sheet 1. It is, however, also possible to use, instead of the lenticular lens sheet 2, any light-diffusing sheet capable of diffusing light by a light-diffusing agent or the like.

Furthermore, in the description of the above embodiment of the invention, there has been taken, as an example, the case where the multiple first prisms 23 formed on the light-source-side surface 4 of the base 1a of the Fresnel lens sheet 1 constitute a Fresnel lens of circular Fresnel type. The above description is also applicable to the case where the multiple first prisms 23 constitute a Fresnel lens of linear Fresnel type.

Furthermore, in the above embodiment, a projection-type television in which imaging light 10 is obliquely projected from the lower side has been taken as an example to explain a projection-type television into which the rear projection screen 3 including the Fresnel lens sheet 1 is incorporated. The above explanation is also applicable to a projection-type television in which imaging light 10 is obliquely projected from the upper side.

The present invention will now be described more specifically by referring to the following examples.

EXAMPLES

Example 1

A Fresnel lens sheet for use in a rear projection screen suitable for a 55-inch projection-type television was made. This Fresnel lens sheet of Example 1 is equivalent to the Fresnel lens sheet 1 shown in FIG. 3A.

A mold for a Fresnel lens (the first prisms) of total reflection type that would constitute the light-source-side surface of the Fresnel lens sheet was firstly made by means of cutting using a cutting tool with a point angle of 40°. This mold was as follows: the prism pitch was 0.1 mm; the Fresnel center of the Fresnel lens was situated outside the mold face; the minimum cutting radius was 200 mm; the prism angle $\phi$ of the prism on the minimum cutting radius was 70.4°; the maximum cutting radius was 1100 mm (usable part 1074 mm); and the prism angle $\phi$ of the prism on the maximum cutting radius was 50.6°. These prism angles $\phi$ meet the following condition: in the case where a Fresnel lens is made from a material having a refractive index of 1.55 and is incorporated into a projection-type television that will be described later, imaging light emerges downwardly from the part of the Fresnel lens situated around the minimum cutting radius, at an angle of approximately 10° to the normal to the sheet surface, while imaging light emerges almost perpendicularly from the part of the Fresnel lens situated around the maximum cutting radius.

Next, a mold for a circular-type, concave Fresnel lens with a prism pitch of 0.0714 mm was prepared as a mold for the stray-light-preclusive second prisms that would constitute the viewing-side surface of the Fresnel lens sheet. The prism on a mold radius of 200 mm was made to have a prism angle $\omega$ of 10°, and this prism angle was gradually decreased to 0.3° as the radius was increased to 360 mm. The prism angle $\omega$ in the peripheral area with radii of more than 360 mm was made constant at 0.3°.

The mold for the Fresnel lens (the first prisms) of total reflection type and the mold for the concave Fresnel lens for the second prisms were superposed on each other with the mold faces facing each other, while positioning the molds so that the two Fresnel centers agreed with each other, thereby forming a cell. Into this cell, an acryl-styrene copolymeric prepolymer, the refractive index of the cured one being 1.55, was poured and then cured to obtain the Fresnel lens sheet of Example 1.

Example 2

A Fresnel lens sheet for use in a rear projection screen suitable for a 55-inch projection-type television was made. This Fresnel lens sheet of Example 2 is equivalent to the Fresnel lens sheet 1' shown in FIG. 3B.

A mold for a Fresnel lens (the first prisms) of total reflection type that would constitute the light-source-side surface of the Fresnel lens sheet was firstly made by means of cutting using a cutting tool with a point angle of 40°, where the conditions used were almost the same as in Example 1. What was different from Example 1 was as follows: the mold was made so that imaging light could emerge from any part of the surface of the Fresnel lens sheet almost perpendicularly to it when the Fresnel lens sheet was made from a material having a refractive index of 1.55 and was incorporated into a projection-type television. To attain this, the prism angle ω of the prism on around the minimum cutting radius was made 66.3°.

Next, to make the stray-light-preclusive second prisms that would constitute the viewing-side surface of the Fresnel lens sheet, there was prepared an acryl-styrene copolymeric, transparent resin substrate having on one surface a linear Fresnel lens (the second prisms) in which the ridgelines of the prisms were extending horizontally with a pitch of 0.14 mm. The transparent resin substrate was made from a material having a refractive index of 1.53, and the linear Fresnel lens was made from an ultraviolet-curing resin, the refractive index of the cured one being 1.55. The prism angle ω of the linear Fresnel lens at the lower edge of the Fresnel lens sheet was made 12°. This prism angle was gradually decreased to 0° as the position of the prism got apart from the lower edge and reached the upper edge of the Fresnel lens sheet.

An ultraviolet-curing resin, the refractive index of the cured one being 1.55, was then applied to the above-prepared mold for the Fresnel lens (the first prisms) of total reflection type. On this mold, the above-described transparent resin substrate was superposed with the ultraviolet-curing resin layer formed on the mold facing the non-prism-formed surface of the transparent resin substrate. Ultraviolet light was then applied to this to obtain the Fresnel lens sheet of Example 2. In the above step, the edge of the transparent resin substrate on which the prisms were formed with greater prism angles ω and the lower edge of the mold were brought to face each other. When the Fresnel lens sheet thus prepared was incorporated into a projection-type television that will be described later, imaging light was found to emerge upwardly from the bottom of the screen at an angle of 18.5° and almost perpendicularly from the top of the screen.

Example 3

A Fresnel lens sheet for use in a rear projection screen suitable for a 55-inch projection-type television was made. This Fresnel lens sheet of Example 3 was equivalent to the Fresnel lens sheet 1" shown in FIG. 3C.

A mold for a convex Fresnel lens of circular type (a convex Fresnel lens whose focal distance was 2600 mm when made from a material having a refractive index of 1.55) with a prism pitch of 0.0714 mm, the Fresnel center being situated at the center of the surface of the Fresnel lens sheet (the intersecting point of the two diagonal lines of the sheet), the prism angle becoming larger as the position of the prism got apart from the Fresnel center, was prepared as a mold for the stray-light-preclusive second prisms that would constitute the viewing-side surface of the Fresnel lens sheet. This mold was so made that the prism angle of the prism on a radius of 342 mm, that is, at the center between the upper and lower edges of the Fresnel lens sheet was 13.5° and that the prism angle of the prism on a radius of 700 mm, that is, at the outermost part (four corners) of the Fresnel lens sheet was 26.2°.

The above-prepared mold for the convex Fresnel lens serving as the second prisms was placed on the mold for the Fresnel lens (the first prisms) of total reflection type made in Example 1 with the two mold faces facing each other. A transparent plastic sheet having a refractive index of 1.55 was inserted between the two molds, and heat compression molding (press molding) was conducted to obtain the Fresnel lens sheet of Example 3.

Comparative Example 1

An ultraviolet-curing resin, the refractive index of the cured one being 1.55, was applied to the mold for the Fresnel lens (first prisms) of total reflection type made in Example 2. A transparent resin substrate (refractive index: 1.53) whose both surfaces were flat was placed on this mold coated with the ultraviolet-curing resin, and ultraviolet light was then applied to obtain a Fresnel lens sheet of Comparative Example 1. When this Fresnel lens sheet was incorporated into a projection-type television that will be described later, imaging light was found to emerge almost perpendicularly from any part of the surface of the Fresnel lens sheet.

Results of Evaluation

The Fresnel lens sheets of Example 1, Example 2, Example 3 and Comparative Example 1 were combined respectively with lenticular lens sheets to obtain rear projection screens. Each one of these rear projection screens was mounted in a projection-type television set with a screen size of 55 inches (aspect ratio 16:9) and a projection distance of 340 mm, in which a light source was placed at 200 mm below the lower edge of the rear projection screen, and evaluation was conducted. In these projection-type television sets, the angle of incidence $θ_1$ at which imaging light was incident on the center (see reference numeral 95 in FIG. 4) of the lower edge of the screen was made 30°, while the angle of incidence $θ_1$ at which imaging light was incident on the ends (see reference numeral 96 in FIG. 4) of the upper edge of the screen was made 72.4°.

The results of the evaluation were as follows: on the projection-type television sets in which the rear projection screens of Examples 1 to 3 were mounted, no double images (ghosts) were observed at all; while on the projection-type television set in which the rear projection screen of Comparative Example 1 was mounted, double images (ghosts) were observed at the bottom of the screen.

What is claimed is:

1. A Fresnel lens sheet for use in a rear projection screen that is used to display an image by allowing imaging light obliquely projected onto the sheet from a light-source side to emerge from the sheet toward a viewing side, the Fresnel lens sheet comprising:
- a sheet-shaped base;
- a plurality of first prisms having substantially triangular cross-sections formed on a light-source-side surface of the base on which the imaging light is projected, each of the first prisms having a first face from which the imaging light enters the first prism and which refracts the incident imaging light, and a second face that totally reflects toward the viewing side at least a part of the imaging light incident on and refracted at the first face; and
- a plurality of second prisms having substantially triangular cross-sections formed on a viewing-side surface of the base from which the imaging light emerges, each of the second prisms being so constructed that, of the imaging light incident on and refracted at the first face of each of the first prisms, those rays that travel to the viewing-side surface without being totally reflected at the second face of each of the first prisms to finally become stray light are controlled with respect to a reflection angle on the viewing-side surface to allow the rays becoming stray light to emerge toward an area outside of a visual field on the viewing side;
- wherein the plurality of first prisms are concentrically formed on the light-source-side surface around a center that is situated at a location off of the base.

2. The Fresnel lens sheet according to claim 1, wherein:
- each of the second prisms has a prism face inclined at a relatively small angle to an extended surface of the base and a rising face rising almost perpendicularly to the extended surface of the base;
- the prism face is positioned so that, of the rays becoming stray light, those rays that return, after being reflected at the prism face, again to the viewing-side surface via the first prism, can emerge from a viewing-side surface at an angle greatly deviated from a line normal to the extended surface of the base; and
- the rising face is positioned so that, of the rays becoming stray light, those rays that are reflected at the rising face, can emerge from the viewing-side surface at an angle greatly deviated from the line normal to the extended surface of the base.

3. The Fresnel lens sheet according to claim 2, wherein a light-absorbing part is provided only on the rising face of each of the second prisms on the viewing-side surface.

4. The Fresnel lens sheet according to claim 2, wherein a light-diffusing part is provided only on the rising face of each of the second prisms on the viewing-side surface.

5. The Fresnel lens sheet according to claim 1, wherein the rays becoming stray light emerge from the viewing-side surface at an angle of 60° or more to a line normal to an extended surface of the base.

6. The Fresnel lens sheet according to claim 1, wherein the plurality of second prisms are formed only on those parts of the viewing-side surface in which the rays becoming stray light are produced.

7. The Fresnel lens sheet according to claim 1, wherein the plurality of second prisms are formed over substantially an entirety of the viewing-side surface.

8. The Fresnel lens sheet according to claim 1, wherein the plurality of second prisms have prism angles that are the same regardless of a position of each second prism on the viewing-side surface.

9. The Fresnel lens sheet according to claim 1, wherein the plurality of second prisms have prism angles that are varied depending on a position of each second prism on the viewing-side surface.

10. The Fresnel lens sheet according to claim 1, wherein the plurality of second prisms are concentrically formed on the viewing-side surface around a center that is situated at a same height as that the center of the concentric circles of the plurality of first prisms.

11. The Fresnel lens sheet according to claim 1, wherein the plurality of second prisms are linearly formed on the viewing-side surface.

12. The Fresnel lens sheet according to claim 1, wherein the plurality of second prisms are concentrically formed on the viewing-side surface around a center of the extended surface of the base.

13. The Fresnel lens sheet according to claim 1, wherein the plurality of first prisms are so constructed that the imaging light passing through the base is inclined to the light-source side relative to a line normal to an extended surface of the base; and the plurality second prisms are so constructed that the imaging light that has passed through the base is inclined to the side opposite to the light-source side relative to the line normal to the extended surface of the base.

14. The Fresnel lens sheet according claim 1, wherein an angle of incidence at which the imaging light is incident on a center of an edge of the base situated closest to a light source is from 30° to 45°, and an angle of incidence at which the imaging light is incident on ends of an edge of the base situated most distantly from the light source is from 70° to 80°.

15. A rear projection screen comprising:
- a Fresnel lens sheet as set forth in claim 1; and
- a light-diffusing sheet arranged on a viewing side of the Fresnel lens sheet.

* * * * *